United States Patent
Namai et al.

(10) Patent No.: US 7,864,242 B2
(45) Date of Patent: Jan. 4, 2011

(54) IMAGE SENSING APPARATUS FOR MAKING AN IMAGE SENSING OPERATION USING A MECHANICAL SHUTTER AND AN ELECTRONIC SHUTTER AND CONTROL METHOD

(75) Inventors: Akihiro Namai, Kawasaki (JP); Hiroshi Kikuchi, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 11/908,859

(22) PCT Filed: Jul. 14, 2006

(86) PCT No.: PCT/JP2006/314435

§ 371 (c)(1),
(2), (4) Date: Sep. 17, 2007

(87) PCT Pub. No.: WO2007/011002

PCT Pub. Date: Jan. 25, 2007

(65) Prior Publication Data

US 2009/0015704 A1    Jan. 15, 2009

(30) Foreign Application Priority Data

Jul. 22, 2005  (JP)  ............................. 2005-213374
Jul. 13, 2006  (JP)  ............................. 2006-193236

(51) Int. Cl.
*H04N 5/238*    (2006.01)
*H04N 5/335*    (2006.01)
(52) U.S. Cl. ..................... 348/367; 348/296; 348/362; 348/363; 348/364

(58) Field of Classification Search ......... 348/362–369; 396/452–504
See application file for complete search history.

(56) References Cited

U.S. PATENT DOCUMENTS 6,542,194 B1    4/2003    Juen (Continued)

FOREIGN PATENT DOCUMENTS

JP        11-041523        2/1999

(Continued)

OTHER PUBLICATIONS

International Search Report issued on Oct. 24, 2006 for International Application No. PCT/JP2006/314435.

(Continued)

*Primary Examiner*—David L Ometz
*Assistant Examiner*—Dwight Alex C Tejano
(74) *Attorney, Agent, or Firm*—Cowan, Liebowitz & Latman, P.C.

(57) ABSTRACT

An image sensing apparatus has an image sensing element which accumulates received light as a charge, a mechanical shutter which travels to shield the image sensing element, and a scan unit which makes a scan for starting charge accumulation. The image sensing apparatus executes the scan for starting charge accumulation prior to traveling of the mechanical shutter and controls the scan for starting charge accumulation and traveling of the shutter to serve as a front curtain and a rear curtain of a shutter. Note that a scan pattern setting unit (113*b*) sets the scan pattern of the charge accumulation start scan based on information associated with a mounted photographing lens.

8 Claims, 19 Drawing Sheets

U.S. PATENT DOCUMENTS

| | | |
|---|---|---|
| 2004/0252225 A1 | 12/2004 | Ojima et al. |
| 2005/0007460 A1 | 1/2005 | Stavely et al. |
| 2005/0110894 A1 | 5/2005 | Hiramatsu |
| 2005/0128324 A1 | 6/2005 | Kishi et al. |
| 2006/0033818 A1* | 2/2006 | Wada et al. ............ 348/208.11 |
| 2006/0077282 A1* | 4/2006 | Kido et al. .................. 348/362 |
| 2006/0087573 A1* | 4/2006 | Harada ....................... 348/294 |
| 2006/0098115 A1* | 5/2006 | Toyoda ....................... 348/362 |

FOREIGN PATENT DOCUMENTS

| | | |
|---|---|---|
| JP | 2005-159418 | 6/2005 |
| JP | 2005-184380 A | 7/2005 |

OTHER PUBLICATIONS

The above reference was cited in a May 6, 2010 Chinese Office Action, which is enclosed with English Translation, that issued in Chinese Patent Application No. 200910118705.2.

The above references (1 to 3) were cited in a Sep. 22, 2010 European Search Report (copy of which is not enclosed) of the counterpart European Patent Application No. 06781390.7.

* cited by examiner

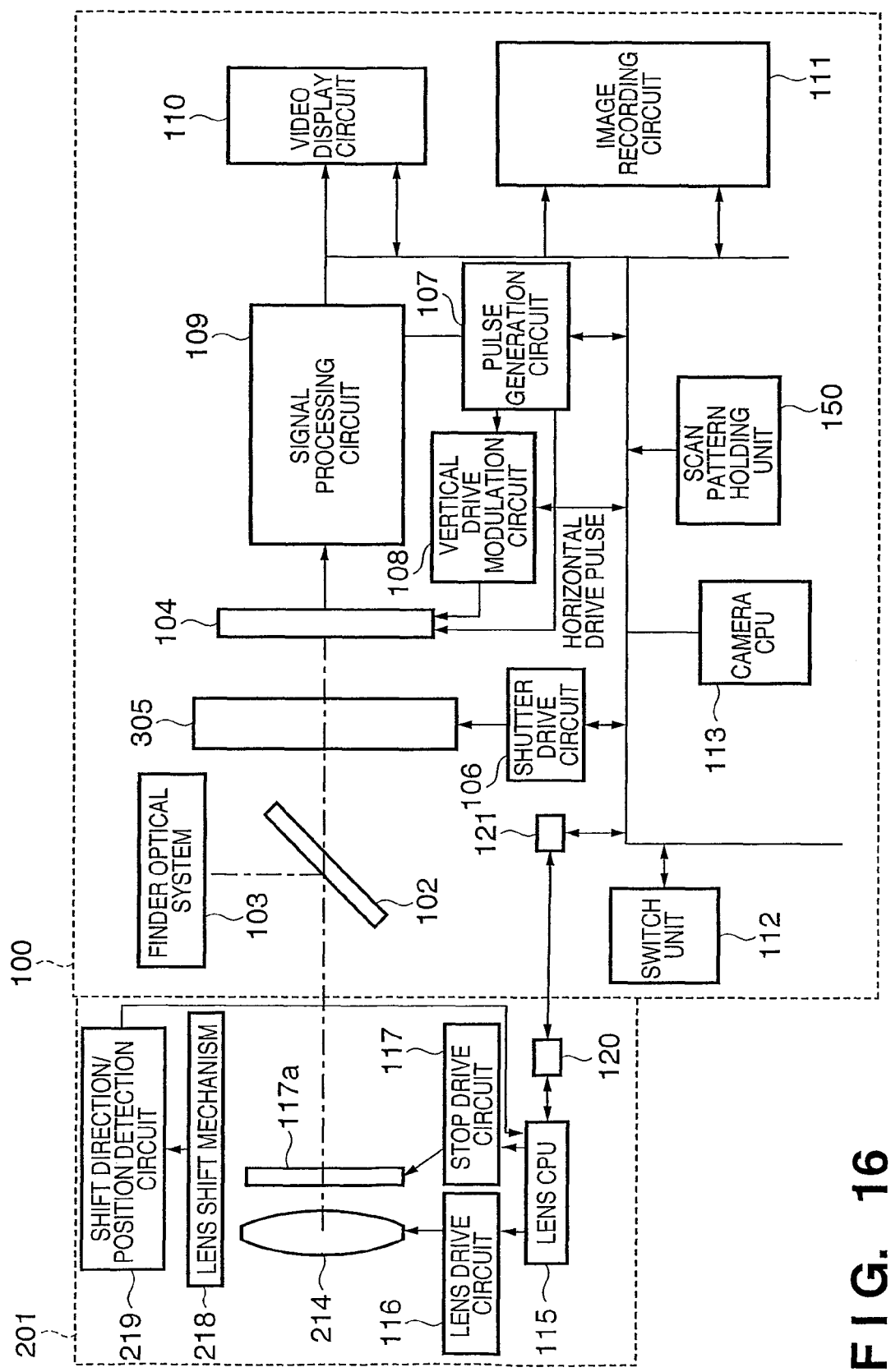
F I G. 16

IMAGE SENSING APPARATUS FOR MAKING AN IMAGE SENSING OPERATION USING A MECHANICAL SHUTTER AND AN ELECTRONIC SHUTTER AND CONTROL METHOD

TECHNICAL FIELD

The present invention relates to an image sensing apparatus for making an image sensing operation using a mechanical shutter and an electronic shutter together.

BACKGROUND ART

Japanese Patent Laid-Open No. 11-41523 discloses a technique for making an image sensing operation using a focal plane shutter (to be referred to as a mechanical shutter hereinafter) and an electronic shutter together in a single-lens reflex type digital camera. In a shutter mechanism of this type, the mechanical shutter forms a rear curtain, and an image is captured by driving the electronic shutter that performs a charge accumulation start scan of pixels of an image sensing element prior to traveling of the rear curtain. In an image sensing element using a CMOS sensor, resetting of pixels (to scan to set accumulated charge amounts of pixels to zero) is done for each pixel or for each region including a plurality of pixels. After an elapse of a predetermined period of time for each pixel or region, a signal read scan is made to implement the electronic shutter. That is, in the charge accumulation start scan of the image sensing element, pixels are reset for, e.g., each scan line, and charge accumulation starts. Such charge accumulation start scan will be referred to as a reset scan hereinafter. After the image sensing element is shielded by the mechanical shutter as the rear curtain, a read scan for reading out charges accumulated on elements of respective pixels is made. Therefore, the scan pattern of this reset scan corresponds to the traveling characteristics of the mechanical shutter as the rear curtain.

In recent years, single-lens reflex type digital cameras have prevailed. The single-lens reflex type digital cameras can normally exchange photographing lenses, and the focal length and the exit pupil distance (the distance from an image sensing plane to the exit pupil position of the lens) changes depending on the photographing lenses attached. When the image sensing apparatus is configured using the aforementioned shutter mechanism that uses the mechanical shutter and electronic shutter together, the electronic shutter functions on the image sensing element surface, but the mechanical shutter is set to be separated from the image sensing element surface in the optical axis direction. Therefore, the light-shielding position of the image sensing plane by the mechanical shutter changes depending on the focal lengths, exit pupil distances, and the like of the photographing lenses. For this reason, when a time period from execution of the reset scan to light-shielding by the mechanical shutter is short, exposure nonuniformity occurs in the shutter traveling direction depending on the mounted photographing lenses.

Also, in some cameras, the exit pupil distance changes depending on stopping-down of a photographing lens, the focus position of a macro lens, and the like. Furthermore, when an anti-vibration lens is mounted, the light-shielding position of the mechanical shutter changes depending on the shift amount of that lens. Therefore, due to these factors, the aforementioned exposure nonuniformity in the shutter scan direction occurs.

To solve these problems, in the shutter mechanism that uses the mechanical shutter and electronic shutter together, further improvements to eliminate exposure nonuniformity in the shutter scan direction due to the circumstances of the lenses or image sensing elements are needed.

DISCLOSURE OF INVENTION

According to one aspect of the present invention, there is provided an image sensing apparatus having an image sensing element which receives light that has passed through an optical unit and accumulates the light as a charge, a mechanical shutter which travels to shield the image sensing element, a scan unit which makes a scan for starting charge accumulation for each region of the image sensing element, and a control unit which executes the scan for starting charge accumulation prior to traveling of the mechanical shutter and controls the scan for starting charge accumulation and traveling of the mechanical shutter so it serves as a front curtain and a rear curtain of a shutter, wherein the control unit sets a timing for performing the scan for starting charge accumulation for each region of the image sensing element so as to eliminate nonuniformity of an exposure amount produced for each region of the image sensing element.

Also, according to one aspect of the present invention, there is provided an image sensing apparatus having an image sensing element which receives light that has passed through an optical unit and accumulates the light as a charge, a first mechanical shutter which travels to expose the image sensing element, a second mechanical shutter which travels to shield the image sensing element, and a scan unit which makes a scan for starting charge accumulation for each region of the image sensing element, comprising: a control unit which performs first exposure control for executing the scan for starting charge accumulation prior to traveling of the second mechanical shutter and controlling the scan for starting charge accumulation and traveling of the second mechanical shutter to serve as a front curtain and a rear curtain of a shutter, and second exposure control for executing the scan for starting charge accumulation prior to traveling of the first mechanical shutter and controlling traveling of the first mechanical shutter and traveling of the second mechanical shutter so they serve as a front curtain and a rear curtain of the shutter, wherein the control unit selectively executes one of the first exposure control and the second exposure control in accordance with a state of the optical unit.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 16 is a block diagram showing the arrangement of an image sensing apparatus according to the third embodiment of the present invention;

BEST MODE FOR CARRYING OUT THE INVENTION

The following description of exemplary embodiments is merely illustrative in nature and is in no way intended to limit the invention, its application, or uses.

Processes, techniques, apparatuses, and materials as known by one of ordinary skill in the art may not be discussed in detail but are intended to be part of the enabling description where appropriate.

First Embodiment

Figure 1:
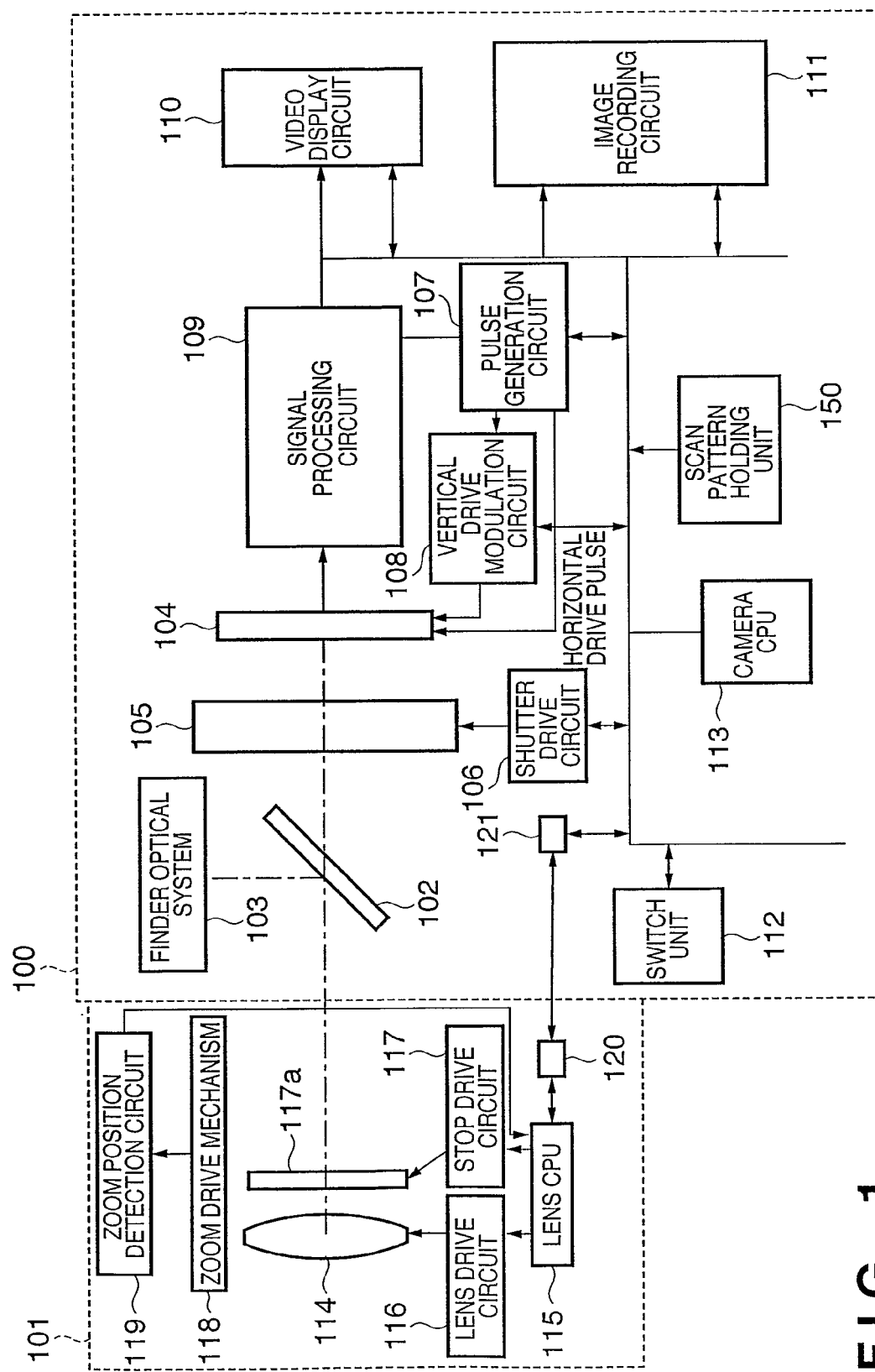
FIG. 1 is a block diagram showing the arrangement of an image sensing apparatus according to the first embodiment of the present invention.

The arrangement of an image sensing apparatus according to this embodiment will be described below using FIG. 1. The image sensing apparatus of this embodiment has a camera main body 100 and an exchangeable lens 101 as an optical unit to be mounted on the camera main body 100. The arrangement in the camera main body 100 will be described first.

When the image sensing apparatus is in a non-photographing state (a state shown in FIG. 1), some rays of an object light beam which has passed through a photographing lens 114 are reflected by a mirror 102 located in a photographing optical path and are guided to a finder optical system 103. As a result, the photographer can observe an object image via the finder optical system 103.

When the photographer presses a release button and the image sensing apparatus shifts from the non-photographing state to a photographing state, the mirror 102 escapes from the photographing optical path. In this manner, the object light beam from the photographing lens 114 goes to an image sensing element 104 side as a CMOS sensor. A focal plane shutter (to be referred to as a mechanical shutter hereinafter) 105 is arranged on the object side (lens side) of the image sensing element 104. The mechanical shutter 105 has a mechanical rear curtain made up of a plurality of light-shielding blades.

A camera CPU 113 controls to drive the mechanical shutter 105 via a shutter drive circuit 106. The image sensing element 104 is supplied with scan clocks (horizontal drive pulses) and predetermined control pulses from a pulse generation circuit 107. Of scan clocks generated by the pulse generation circuit 107, vertical scan clocks are modulated to a predetermined clock frequency by a vertical drive modulation circuit 108, and are input to the image sensing element 104. This vertical drive modulation circuit 108 determines the scan pattern of a reset scan as an electronic front curtain. The pulse generation circuit 107 also outputs a clock signal to a signal processing circuit 109. The signal processing circuit 109 generates image data by applying predetermined processing (color processing, gamma correction, and the like) to a signal read out from the image sensing element 104. The generated image data is output to a video display circuit 110, and is displayed as a photographed image or is recorded by an image recording circuit 111. A switch unit 112 includes switches operated to set photographing conditions and the like, and switches (release button) operated to start a photographing preparation operation and a photographing operation. The camera CPU 113 takes actions in response to the operations of the switch unit 112.

The arrangement in the exchangeable lens 101 will be described below. The photographing lens 114 is movable in the optical axis direction. Note that FIG. 1 illustrates the photographing lens 114 as a single lens, but the lens 114 includes a plurality of lens units like a zoom lens and the like in practice. The lens CPU 115 controls to drive the photographing lens 114 via a lens drive circuit 116. The lens CPU 115 drives a stop drive mechanism 117a via a stop drive circuit 117 to attain stop control according to the object luminance in the photographing operation. By operating a zoom drive mechanism 118 (manual operation in this embodiment), a zoom position is determined. The determined zoom position is detected by a zoom position detection circuit 119, and is sent to the lens CPU 115. The lens CPU 115 can communicate with the camera CPU 113 in the camera main body 100 via a communication contact 120 on the exchangeable lens 101 side and a communication contact 121 on the camera main body 100 side. The lens CPU 115 notifies the camera CPU 113 of the type, focal length, exit pupil distance, zoom position, and the like of the exchangeable lens 101. A scan pattern holding unit 150 holds a plurality of types of scan patterns (operation patterns of a reset line) of the electronic front curtain (to be described later).

The image sensing apparatus of this embodiment adopts an electronic shutter (electronic front curtain) in place of a general mechanical front curtain, and makes actual photographing using the electronic front curtain and mechanical rear curtain.

Figure 2:
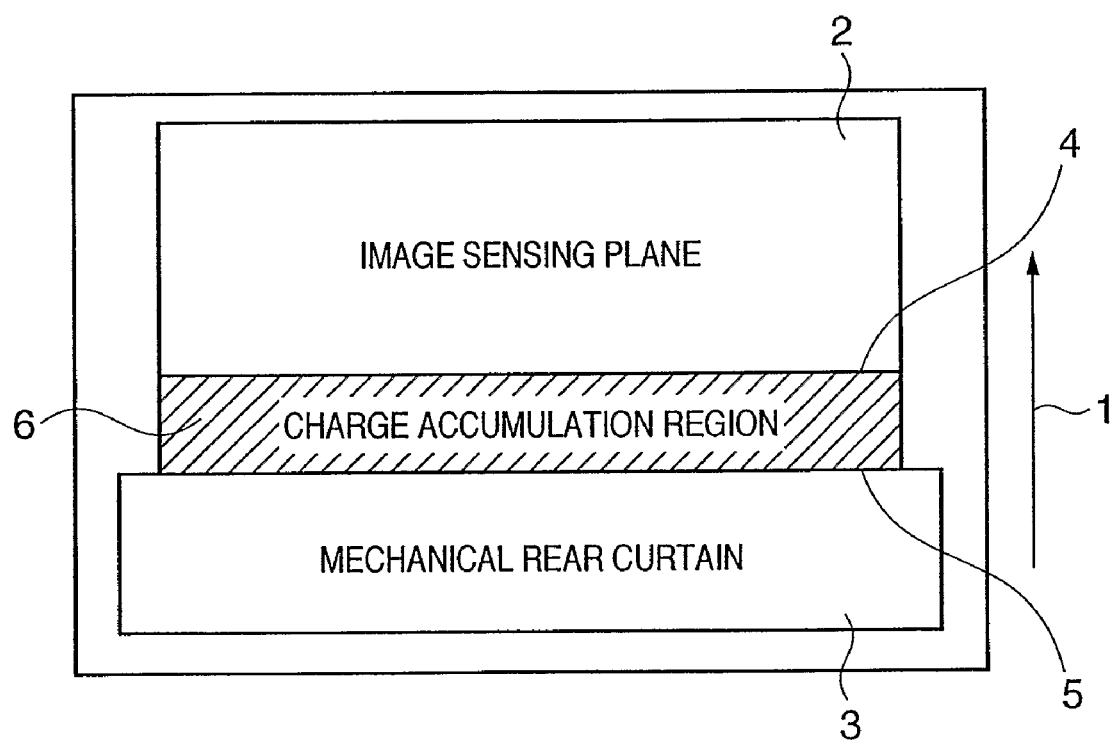
FIG. 2 is a front view showing the relationship between an electronic front curtain and mechanical rear curtain.

FIG. 2 shows a state wherein the image sensing element and the mechanical rear curtain are observed from the lens side along the optical axis direction. FIG. 2 shows a state in which the reset scan of the electronic front curtain and shutter traveling of the mechanical rear curtain are in progress after photographing starts upon pressing of the release button. An arrow 1 indicates the scan direction of the reset scan of the electronic front curtain (the traveling direction of the electronic front curtain) and the traveling direction of the mechanical rear curtain. Note that when the reset scan of the electronic front curtain is to be made in the photographing operation, an object image formed on the image sensing plane of the image sensing element 104 via the photographing lens 114 is vertically inverted. For this reason, when the reset scan progresses from the lower side toward the upper side of the image sensing plane, as shown in FIG. 2, the reset scan and shutter traveling are made from the image upper portion to the image lower portion.

Referring to FIG. 2, reference numeral 2 denotes an image sensing plane of the image sensing element 104. Reference numeral 3 denotes a mechanical rear curtain of the mechanical shutter 105. FIG. 2 illustrates a state wherein the mechanical rear curtain 3 shields a partial region of the image sensing plane 2. Reference numeral 4 denotes a line (reset line) of the image sensing element 104 where the reset scan is underway. The reset scan is to reset the accumulated charge amounts of pixels on the reset line 4 to zero, and the reset line 4 corresponds to the leading end of the electronic front curtain.

A region 6 formed by a slit between the reset line 4 and a leading end portion 5 of the mechanical rear curtain 3 is a region (charge accumulation region) of the image sensing element 104' where charge accumulation is made by exposure. The charge accumulation region moves in the direction of the arrow 1 according to traveling of the electronic front curtain and the mechanical rear curtain. For each pixel in the image sensing element 104, a time period from when the reset line 4 has passed, i.e., from when the reset operation has started until that pixel is in a light-shielded state by the mechanical rear curtain 3 corresponds to a charge accumulation time period of that pixel by exposure. Since the reset line 4 travels in the direction of the arrow 1, and charge accumulation of each line starts, the charge accumulation start timings are different for respective lines on the image sensing element 104. That is, the charge accumulation operation starts earliest at the lowermost line of the image sensing plane 2, and it starts latest at the uppermost line.

The movement of the reset line 4 which moves from the lower portion to the upper portion of the image sensing plane 2 is controlled by the vertical drive modulation circuit 108. The movement of the reset line is controlled, as will be described later using FIGS. 5A and 5B, and the moving pattern of the reset line 4 is called a scan pattern. The scan pattern indicates the timings of the reset scan for respective regions (lines) of the image sensing element. The scan pattern holding unit 150 holds a plurality of such scan patterns. The camera CPU 113 selects one of these scan patterns, and controls the vertical drive modulation circuit 108 to move the reset line 4 according to the selected scan pattern. Details will be described later.

Figure 3:
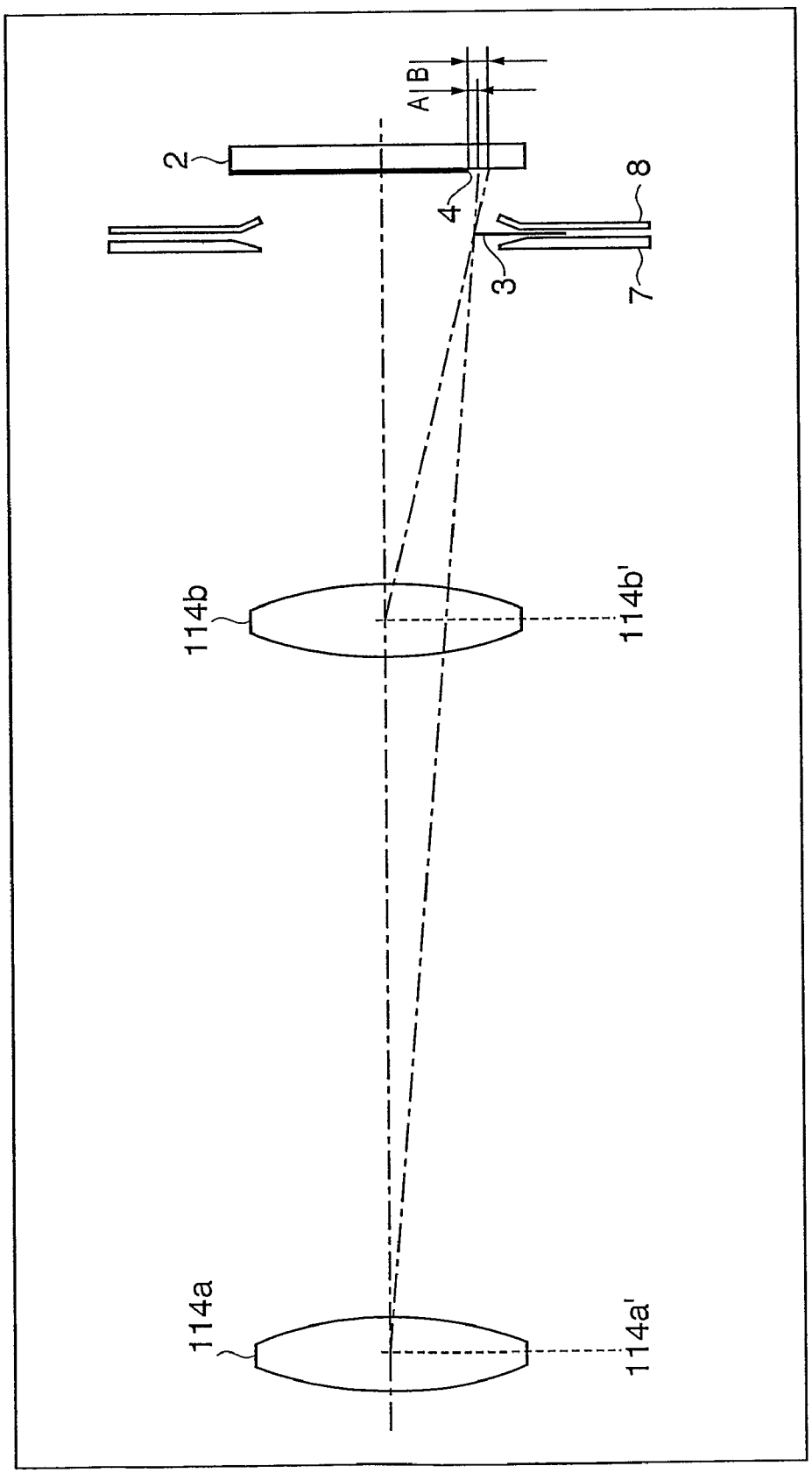
FIG. 3 is a sectional view showing the relationship among the exit pupil distance, the mechanical rear curtain, and the electronic front curtain in the former half of a photographing operation.
Figure 4:
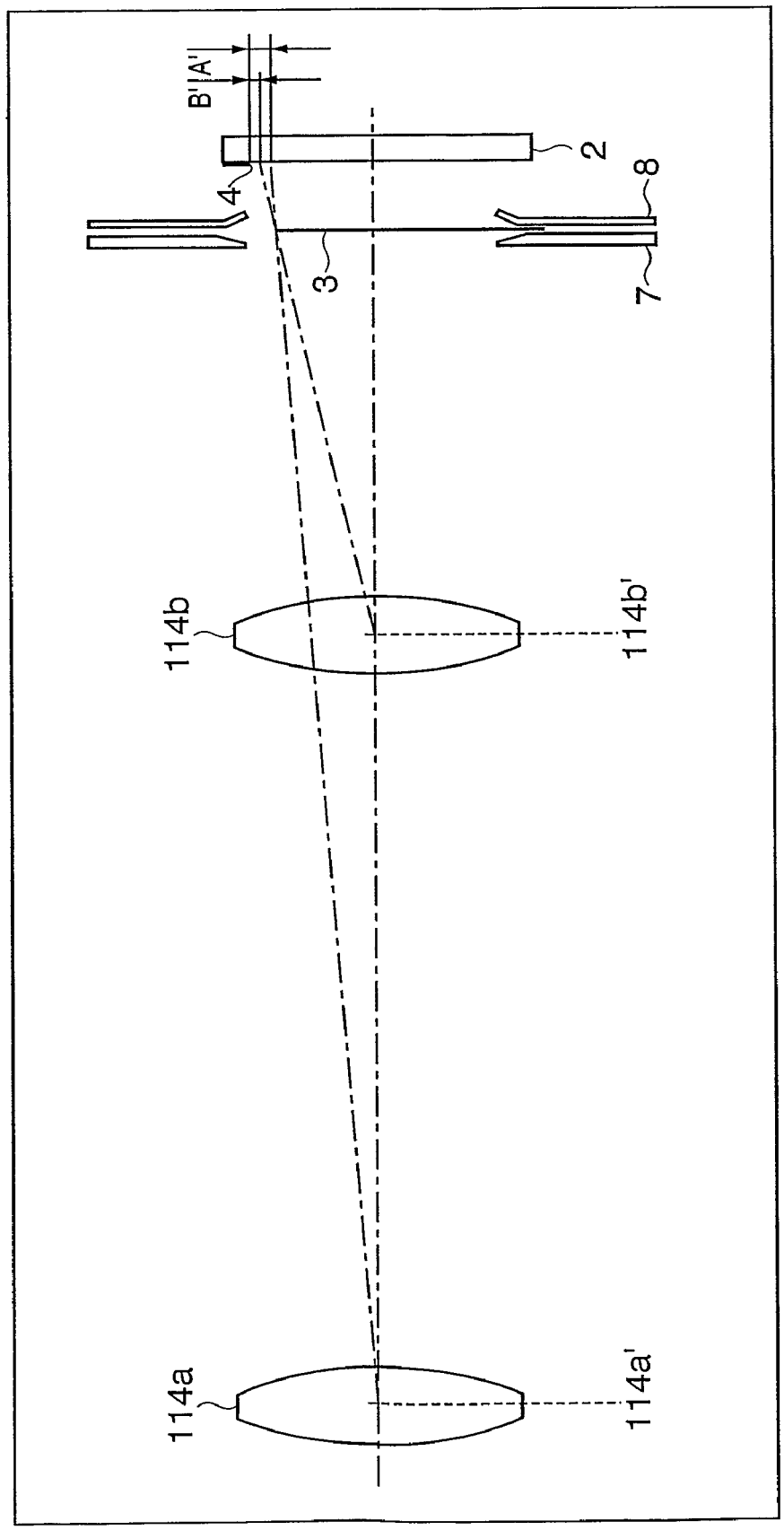
FIG. 4 is a sectional view showing the relationship among the exit pupil distance, the mechanical rear curtain, and the electronic front curtain in the latter half of the photographing operation.

FIGS. 3 and 4 are sectional views showing the relationship among the photographing lens, mechanical shutter, and image sensing element. In FIGS. 3 and 4, a lens 114a indicates a photographing lens in a state wherein the focal length is long and the exit pupil distance is long, and a lens 114b indicates a photographing lens in a state wherein the focal length is short and the exit pupil distance is short. Reference numeral 7 denotes a shutter base plate; and 8, a shutter blade holding member. Reference numerals 114a' and 114b' denote the pupil positions (exit pupil positions) of the lenses 114a and 114b, respectively.

FIG. 3 shows a state wherein the shutter begins to open in the photographing operation. A slit width A indicates the width of a region formed by a line where a light beam coming from the lens 114a with a long exit pupil distance is shielded by the mechanical rear curtain 3, and the reset line 4. A slit width B indicates the width of a region formed by a line where a light beam coming from the lens 114b with a short exit pupil distance is shielded by the mechanical rear curtain 3, and the reset line 4.

At the timing of FIG. 3, the slit width B is larger than the slit width A. Hence, when the electronic front curtain and the mechanical rear curtain are to be driven under the same condition, the exposure amount when the lens 114b is used becomes larger than that when the lens 114a is used in the region indicated by the slit width B. Therefore, when the scan pattern of the reset scan of the electronic front curtain is set to obtain an appropriate exposure value by the lens 114a, overexposure occurs at the beginning of opening of the shutter when photographing is made by the lens 114b.

FIG. 4 shows a state of the latter half of the photographing operation (near the end of photographing). A slit width A' indicates the width of a region formed by a line where a light beam coming from the lens 114a with a long focal length and a long exit pupil distance is shielded by the mechanical rear curtain 3, and the reset line 4. A slit width B' indicates the width of a region formed by a line where a light beam coming from the lens 114b with a short focal length and a short exit pupil distance is shielded by the mechanical rear curtain 3, and the reset line 4.

At the timing shown in FIG. 4, the slit width B' is smaller than the slit width A' contrary to the state in which the shutter begins to open shown in FIG. 3. Hence, when the electronic front curtain and the mechanical rear curtain are to be driven under the same condition, the exposure amount when the lens 114a is used becomes larger than that when the lens 114b is used in the region indicated by the slit width A'. Therefore, when the scan pattern of the reset scan of the electronic front curtain is set to obtain an appropriate exposure value by the lens 114a, underexposure occurs at the beginning of opening of the shutter when photographing is made by the lens 114b. As a result, exposure nonuniformity (i.e., that in the vertical direction) occurs in the upper and lower portions of an image.

Figure 5A:
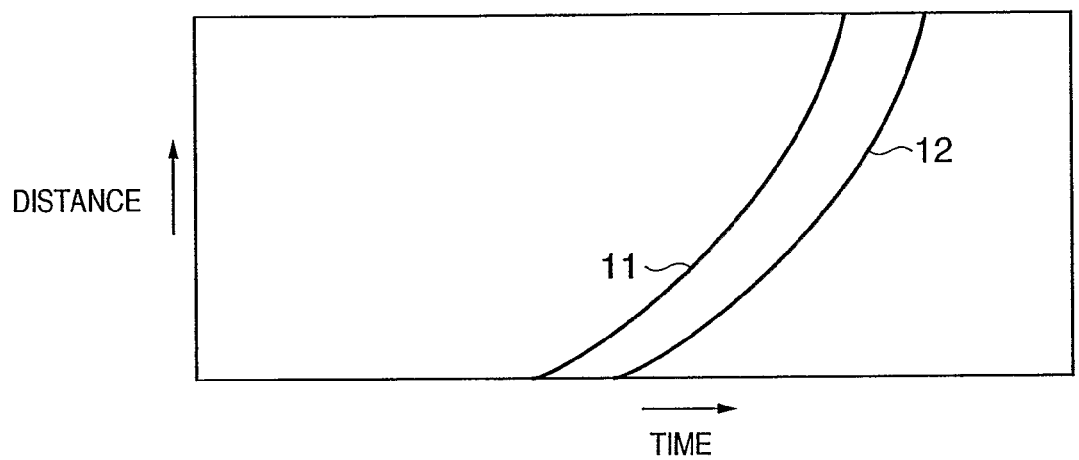
FIGS. 5A and 5B are graphs showing the relationship between the scan curves of the electronic front curtain and those of the mechanical rear curtain at different exit pupil distances.
Figure 5B:
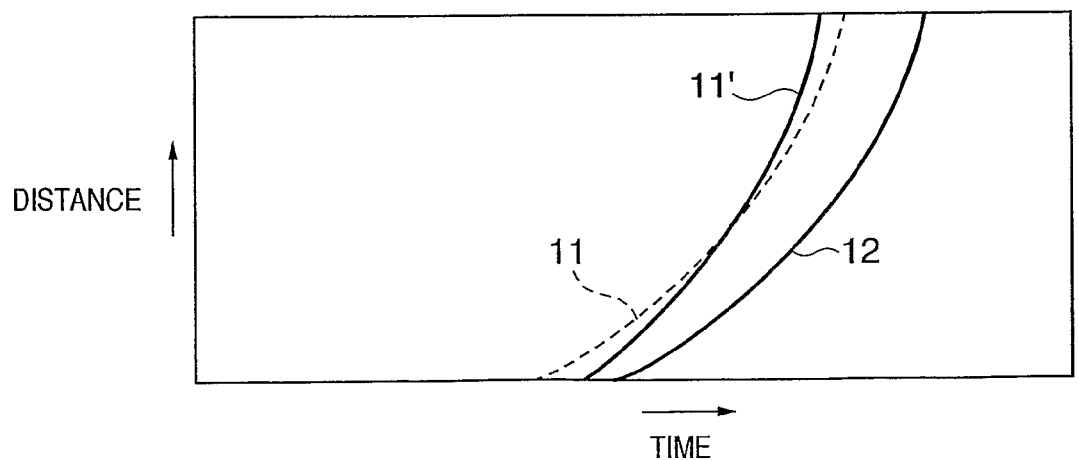

FIGS. 5A and 5B show the relationship between the scan pattern of the reset scan of the electronic front curtain and the traveling pattern of the mechanical rear curtain under the shutter control. In FIGS. 5A and 5B, the abscissa plots time, and the ordinate plots the distance (position) from the top to the bottom on the image sensing element. In FIG. 5A, reference numeral 12 denotes a traveling curve of the mechanical rear curtain, which represents a state wherein the speed gradually increases from the beginning of traveling. Reference numeral 11 denotes a scan curve of the reset scan of the electronic front curtain. The distance between the scan curve 11 and the traveling curve 12 in the time direction represents an exposure time period of each line of the image sensing element. In FIG. 5A, nearly the same exposure time periods are set from the bottom to the top of the image sensing element. When the focal length and exit pupil distance of the photographing lens are sufficiently long (e.g., 500 mm or more), an appropriate exposure value can be obtained by the scan curve with a shape substantially the same as that of the traveling curve of the mechanical rear curtain.

However, when the lens having a short focal length and short exit pupil distance is used, as described above, the angle of incidence of light rays that have passed through the lens to the image sensing element can be large with respect to the optical axis compared to the lens having a long exit pupil distance. For this reason, with the shutter control shown in FIG. 5A, overexposure occurs on the lower portion of the image sensing plane (=the upper portion of an image), and underexposure occurs on the upper portion of the image sensing plane (=the lower portion of an image). For this reason, the scan curve of the electronic front curtain is adjusted to shorten the exposure time period on the lower portion of the image sensing plane, and to prolong the exposure time period on the upper portion of the image sensing plane. That is, the scan curve 11 must be corrected to a scan curve 11', as shown in FIG. 5B.

Figure 6:
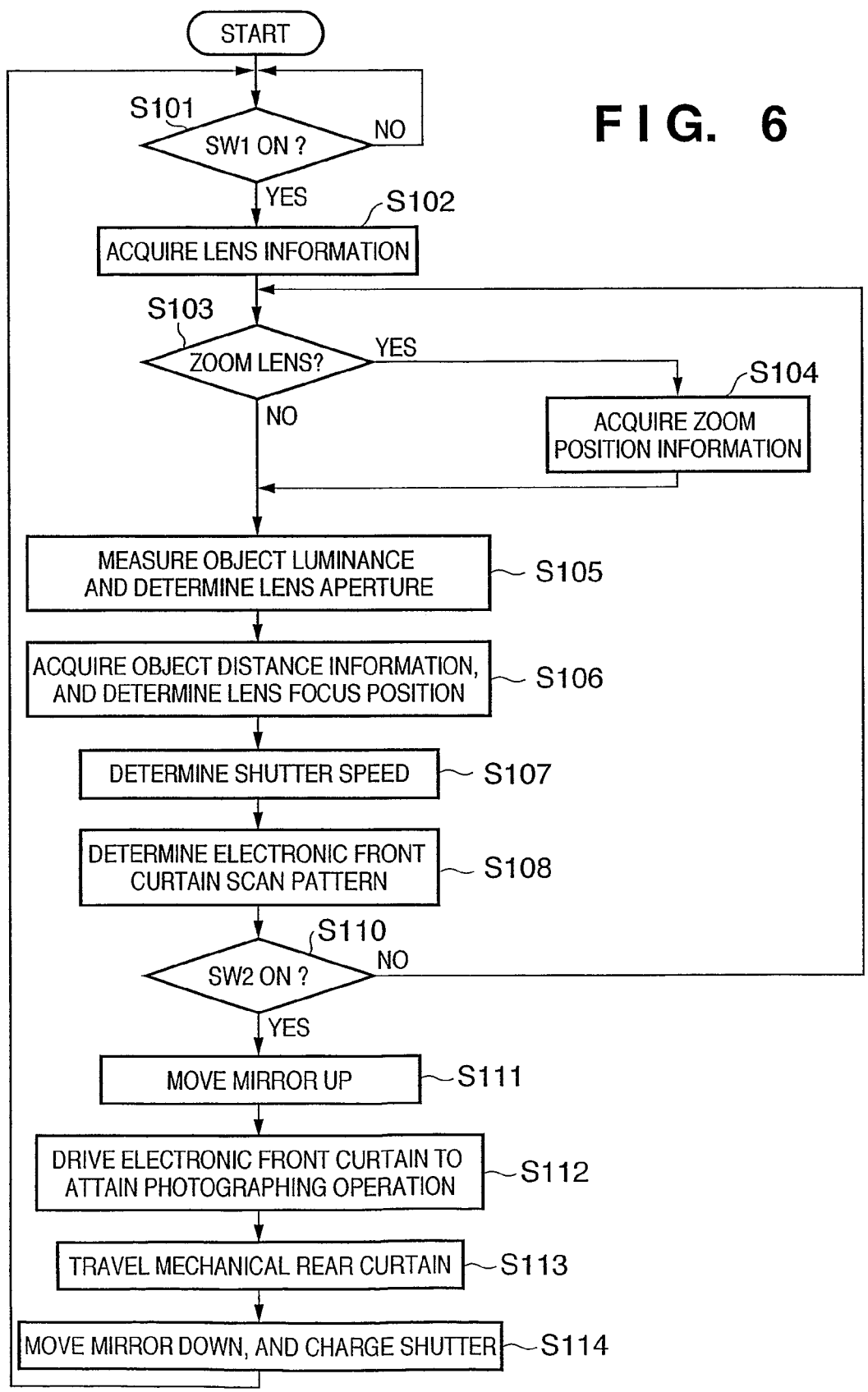
FIG. 6 is a flowchart showing the photographing operation of the image sensing apparatus according to the first embodiment of the present invention.

The aforementioned correction processing will be described below with reference to the flowchart of FIG. 6 while following the operations of the camera. Note that the processing shown in FIG. 6 is mainly executed by the camera CPU 113.

When the first stroke position of the release button in the switch unit 112 (so-called half-stroke state) is detected (SW1ON state), the flow advances from step S101 to step S102. In step S102, the camera CPU 113 acquires lens information (the focal length, exit pupil distance, and the like) of the mounted exchangeable lens 101 from the lens CPU 115. If the mounted exchangeable lens 101 is a zoom lens, the flow advances from step S103 to step S104 to acquire zoom position information from the lens CPU 115. Note that the lens CPU 115 of the exchangeable lens 101 sends the lens information (the focal length, exit pupil distance, and the like) of the lens, and the zoom position information generated based on the zoom position detected by the zoom position detection circuit 119 in response to requests from the camera CPU 113.

In step S105, the aperture value of the lens is determined based on the output from a photometry sensor (not shown) and information such as an ISO sensitivity setting and the like. The flow then advances to step S106 to acquire object distance information by a ranging system (not shown) and to determine the focus position of the photographing lens. In step S107, the shutter speed is determined based on the object luminance, aperture value, ISO sensitivity setting, and the like. In next step S108, the scan curve pattern of the electronic front curtain is determined based on the focal length, exit pupil position, aperture value, focus position, and the like of the exchangeable lens 101. In this case, the camera CPU 113 changes the setting of the vertical drive modulation circuit 108 to, e.g., that of the scan curve 11' shown in FIG. 5B. This scan curve 11' is appropriate to a case of the lens having a short focal length and short exit pupil distance. The scan curve 11' is obtained by delaying the start timing of the reset scan of the electronic front curtain and advancing the scan end timing with respect to the scan curve 11 indicating the nearly equal operation to that of the traveling curve 12 of the mechanical rear curtain.

Figure 7:
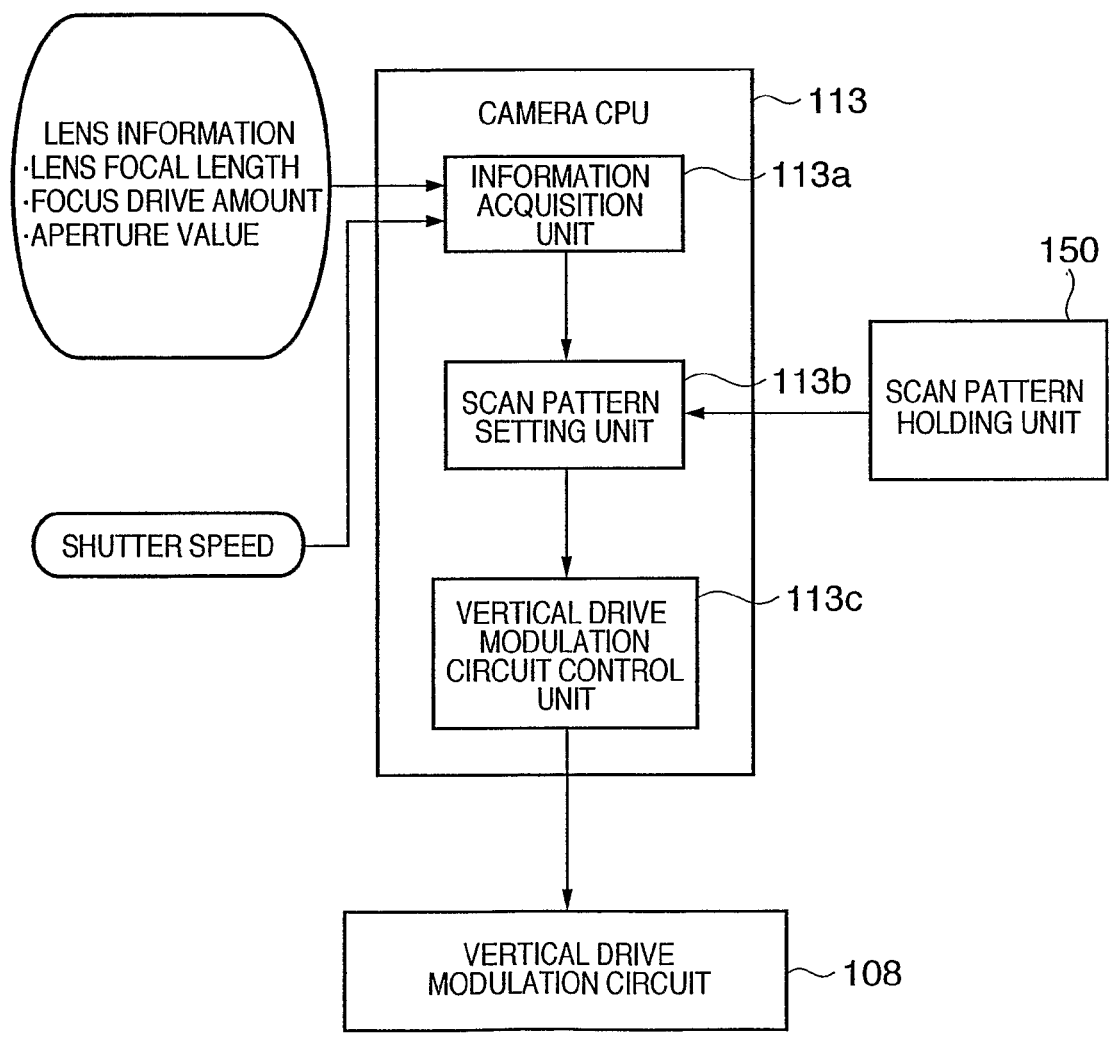
FIG. 7 is a block diagram for explaining the functional arrangement for scan pattern control by a camera CPU of the image sensing apparatus according to the first embodiment of the present invention.
Figure 8:
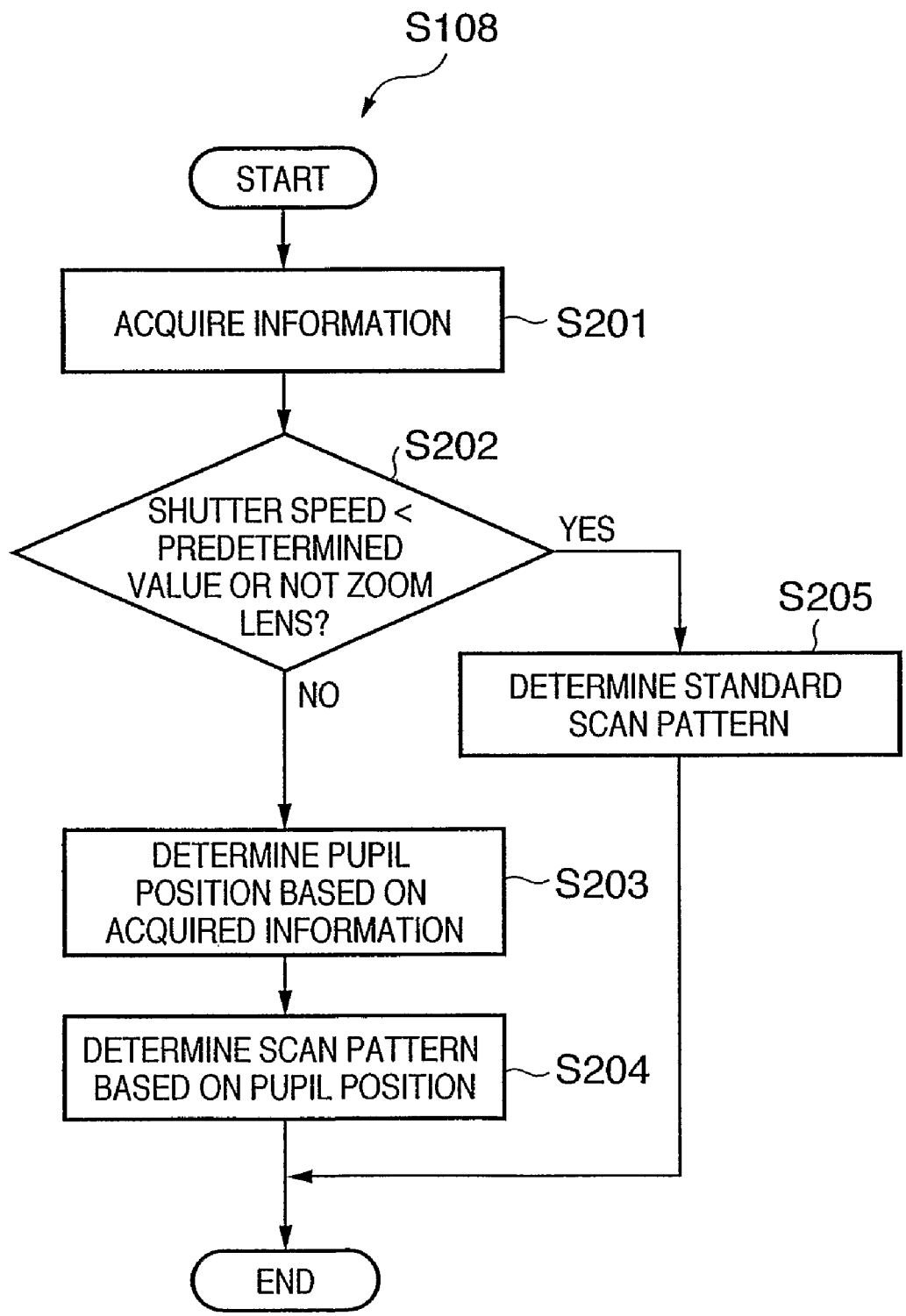
FIG. 8 is a flowchart for explaining the determination processing of a scan pattern of the image sensing apparatus according to the first embodiment of the present invention.

The processing in step S108 will be described in more detail below with reference to FIGS. 7 and 8. FIG. 7 is a block diagram showing the arrangement associated with the scan pattern control of the electronic front curtain (reset scan) according to this embodiment. FIG. 8 is a flowchart showing the setting processing (step S108) of the scan pattern.

The camera CPU 113 serves as an information acquisition unit 113a, a scan pattern setting unit 113b, and a vertical drive modulation circuit control unit 113c. The information acquisition unit 113a acquires information associated with the exit pupil distance, and passes it to the scan pattern setting unit 113b (step S201). That is, the information acquisition unit 113a acquires information used in determination of the exit pupil distance from among the information acquired in steps S102 to S104 and the information set in steps S105 to S107. The scan pattern setting unit 113b determines the scan pattern of the electronic front curtain based on the information acquired by the information acquisition unit 113a (steps S202 to S205).

It is checked in step-S202 if a condition that the shutter speed is lower than a predetermined value (the shutter time is longer than a predetermined value), or the exchangeable lens 101 is not a zoom lens is satisfied. If this condition is satisfied, the flow advances to step S205 to determine a standard scan pattern as that to be adopted. In this embodiment, as the standard scan pattern, a scan curve having substantially the same curve shape of that of the mechanical rear curtain like the scan curve 11 shown in FIG. 5A (the exposure time periods of respective lines of the image sensing element from the beginning to the end of photographing are nearly the same) is adopted.

Exposure nonuniformity caused depending on the focal length and exit pupil distance of the photographing lens is especially considerably produced when the slit width of the shutter is narrow at a high shutter speed. Hence, in this embodiment, in the shutter time range in which the shutter time is long (e.g., ⅛ sec or less), and exposure nonuniformity can be sufficiently ignored even if it occurs, the scan pattern of the reset scan of the electronic front curtain is not corrected. Of course, this arrangement is an option, and steps S202 and S205 may be omitted.

On the other hand, if the exchangeable lens 101 is a zoom lens and the shutter speed is equal to or higher than the predetermined value (the shutter time is equal to or smaller than the predetermined value), the flow advances from step S202 to step S203. The scan pattern setting unit 113b determines the exit pupil distance based on the information acquired in step S201. In step S204, the scan pattern setting unit 113b determines a scan pattern to be adopted based on the determined exit pupil distance. In other words, the scan pattern to be adopted is determined in accordance with the ratio of the distance between the exit pupil position of the photographing lens 114 and mechanical shutter 105 to that between the mechanical shutter 105 and image sensing element 104. In this embodiment, since the distance between the mechanical shutter 105 and image sensing element 104 is fixed, the scan pattern can be determined from the information associated with the exit pupil distance if such distance is not calculated.

In this embodiment, a plurality of scan patterns are held in the scan pattern holding unit 150. The scan pattern setting unit 113b selects a scan pattern to be applied from those in the scan pattern holding unit 150 on the basis of the exit pupil distance determined based on the information acquired from the information acquisition unit 113a. For example, scan patterns used to suppress exposure nonuniformity to fall within the allowable range are registered in association with the exit pupil distances. The scan pattern setting unit 113b reads out a corresponding scan pattern according to the exit pupil distance determined in step S203 from the scan pattern holding unit 150, and determines the scan pattern to be applied. More specifically, for example, a scan pattern in which a shorter exposure time period is set on the lower portion of the image sensing plane and a longer exposure time period is set on the upper portion of the image sensing plane with decreasing exit pupil distance is selected. In this manner, for example, if the shutter time remains the same, the scan pattern setting unit 113b sets a different scan pattern if the exit pupil distance is different.

Referring back to FIG. 6, after the scan pattern of the reset scan of the electronic front curtain is determined, the second stroke position of the release button, i.e., a full stroke state (SW2ON), is detected, and the flow advances from step S110 to step S111 to execute a photographing operation. In step S111, the mirror 102 is moved up. In step S112, the electronic front curtain begins to be driven based on the scan curve determined in step S108. That is, the vertical drive modulation control circuit unit 113c controls the vertical drive modulation circuit 108 to execute the reset scan according to the scan pattern determined by the scan pattern setting unit 113b. In step S113, the mechanical rear curtain is then controlled to be driven.

For example, when the photographing lens 114 of the exchangeable lens 101 is a lens having a short focal length and short exit pupil distance, the scan curve 11' in FIG. 5B is selected, and driving of the electronic front curtain (reset scan) is executed according to this scan pattern. On the other hand, traveling of the mechanical rear curtain is executed according to the traveling curve 12. In this way, the charge accumulation operation is sequentially made on the image sensing element, thus completing the photographing operation. Finally, in step S114 the mirror 102 is moved down, and the shutter is charged, thus ending a photographing sequence.

As described above, according to this embodiment, since the scan pattern of the electronic front curtain is switched based on the information of the photographing lens, an appropriate image from which exposure nonuniformity is eliminated can be taken.

Note that the exit pupil distance can be determined in step S203 based on, e.g., the lens focal length acquired from the lens CPU 115 of the mounted exchangeable lens 101. The exit pupil distance need not be especially explicitly determined. For example, the scan pattern may be switched by directly using the lens focal length.

Examples of information that can be used to switch the scan pattern (or to determine the exit pupil distance) include the following ones. In this embodiment, these pieces of information (including information of the exit pupil distance itself) acquired to be used in determination of the scan pattern will be generally referred to as information associated with the exit pupil distance. The information associated with the exit pupil distance includes the following ones.

For example, in a lens with a large extended amount upon focusing such as a macro lens or the like, the exit pupil distance changes depending on that extended amount. Therefore, the scan pattern of the reset scan of the electronic front curtain may be changed according to the focus information such as the extended amount upon focusing.

On the other hand, in some lenses with large open aperture values (e.g., F1.2), enlarging the aperture diameter causes an exposure nonuniformity like the one generated by a lens having short exit pupil distance. When the mechanical shutter 105 is used, the above nonuniformity can be removed by shortening a time period from the start of the reset scan until the mechanical rear curtain passes on the lower portion of the image sensing plane, and prolonging such time period on the upper portion of the image sensing plane. Furthermore, generally, when the focal length of a zoom lens is short, the exit pupil distance is also short. Therefore, exposure unevenness may be removed by shortening a time period from the start of the reset scan until the mechanical rear curtain passes on the lower portion of the image sensing plane and prolonging such time period on the upper portion of the image sensing plane. However, in some kinds of lens, the exit pupil distance is elongated when the focal length of a zoom lens is shorten. Therefore, it is necessary to suitably select a scan pattern in accordance with the type of the lens.

As for the scan patterns of the reset scan of the electronic front curtain, lenses are grouped based on the allowable ranges of exposure nonuniformity, and the scan pattern of the reset scan of the electronic front curtain may be changed for each group. In this case, the scan pattern is determined based on the lens type.

Second Embodiment

Figure 9:
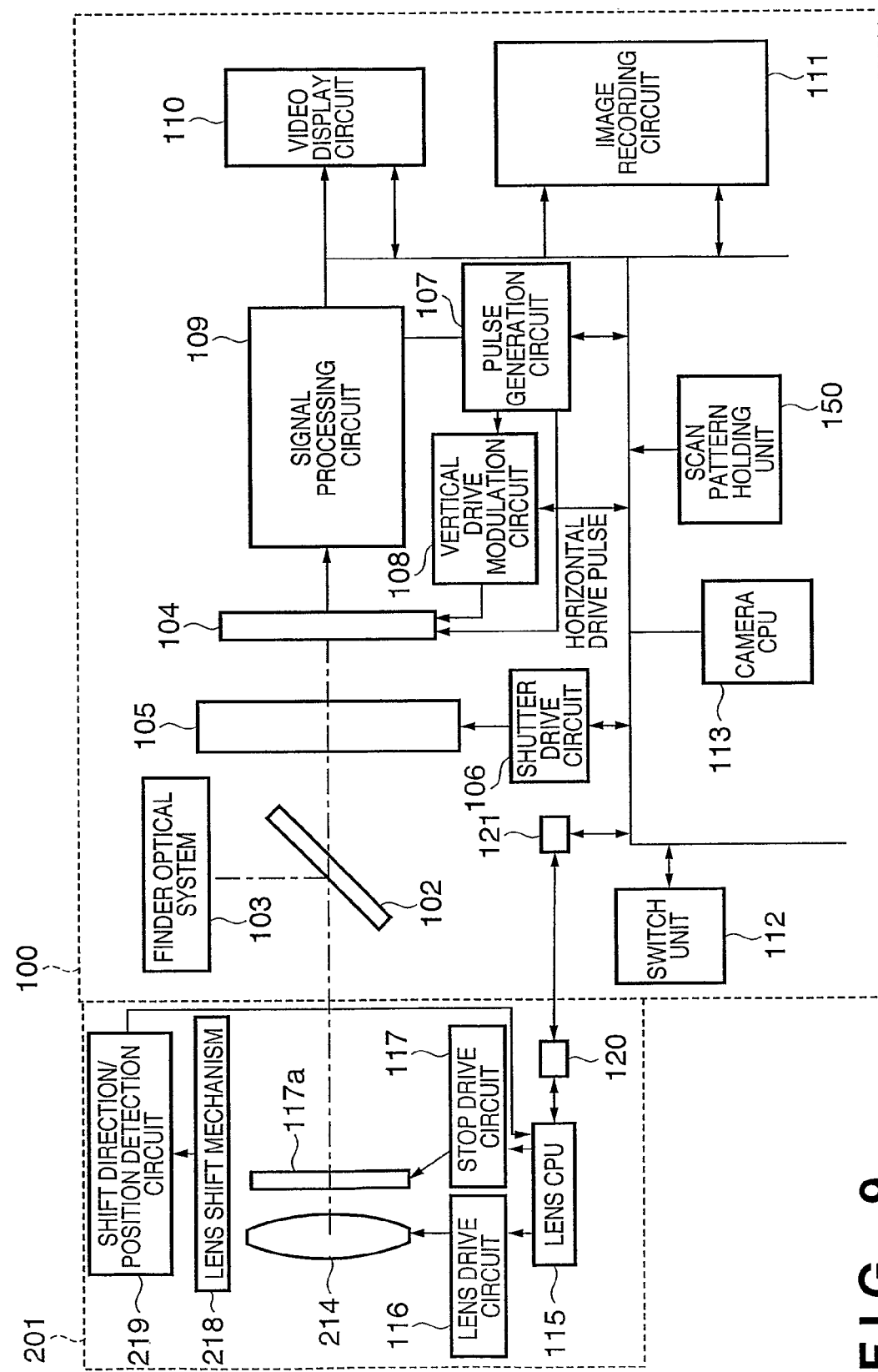
FIG. 9 is a block diagram showing the arrangement of an image sensing apparatus according to the second embodiment of the present invention.

The arrangement of an image sensing apparatus according to the second embodiment of the present invention will be described below using FIG. 9. The image sensing apparatus according to the second embodiment is substantially the same as that shown in the first embodiment (FIG. 1), except that an exchangeable lens 201 comprises a shiftable photographing lens 214, a lens shift mechanism 218, and a shift position direction/detection circuit 219.

The photographing lens 214 is movable in the optical axis direction to attain an in focus state, and is a lens which has a shift mechanism that allows translation in a direction intersecting (perpendicular to) the optical axis, as will be described later, and allows so called tilt/shift photographing. By operating the lens shift mechanism 218, the shift position of the photographing lens 214 is determined. The determined shift position is detected by the shift position direction/detection circuit 219 and is sent to the lens CPU 115.

Figure 10:
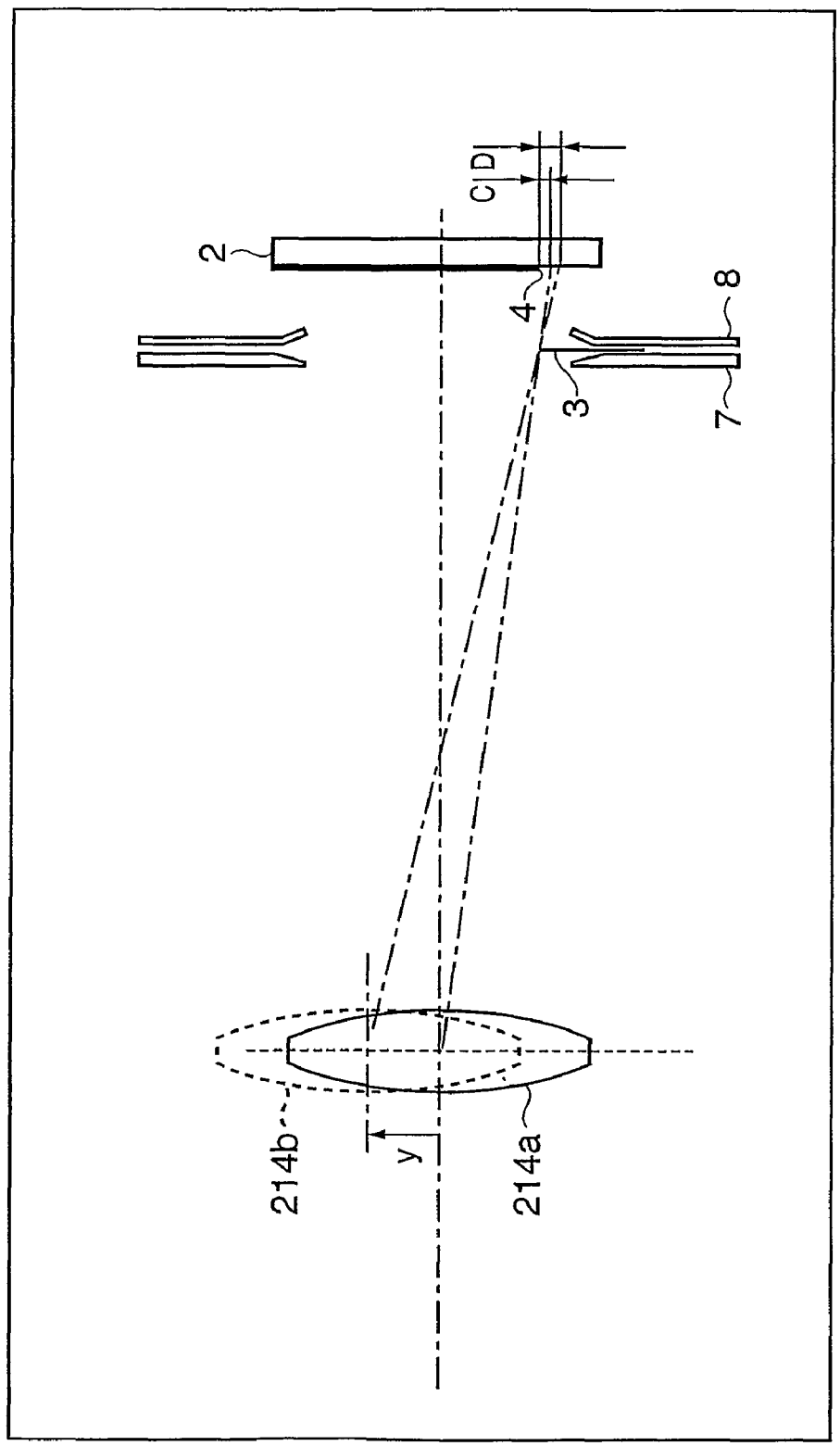
FIG. 10 is a sectional view showing the relationship among a lens shift amount, mechanical rear curtain, and electronic front curtain in the former half of a photographing operation.
Figure 11:
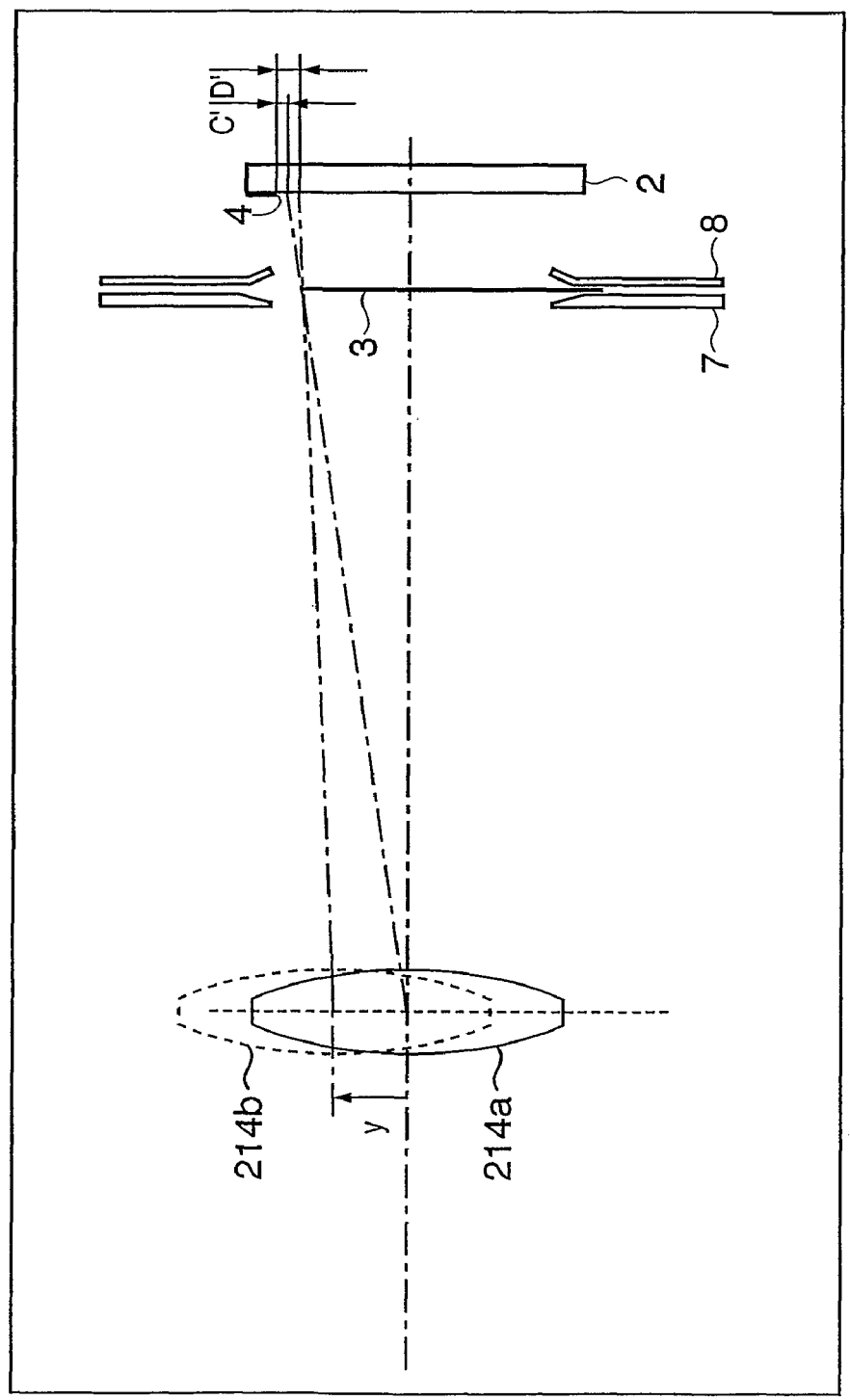
FIG. 11 is a sectional view showing the relationship among the lens shift amount, mechanical rear curtain, and electronic front curtain in the posterior half of the photographing operation.

FIGS. 10 and 11 are sectional views showing the relationship among the photographing lens, mechanical shutter, and image sensing element in this embodiment. In FIGS. 10 and 11, a lens 214a indicated by the solid line indicates a lens which is located at a reference optical axis position without being shifted (zero shift amount). A lens 214b indicated by the broken line indicates a lens which is located at a position shifted by a shift amount y from the reference optical axis position in the same direction as the traveling direction of the mechanical shutter. Reference numeral 7 denotes a shutter base plate; and 8, a shutter blade holding member.

FIG. 10 shows a state wherein the shutter begins to open in the photographing operation. A slit width C indicates the width of a region formed by a line where a light beam coming from the lens 214a with zero shift amount is shielded by the mechanical rear curtain 3, and the reset line 4. A slit width D indicates the width of a region formed by a line where a light beam coming from the lens 214b with the shift amount y is shielded by the mechanical rear curtain 3, and the reset line 4.

At the timing of FIG. 10, the slit width D is larger than the slit width C. Hence, when the electronic front curtain and the mechanical rear curtain are to be driven under the same condition, the exposure amount obtained at the position of the lens 214b becomes larger than that obtained at the position of the lens 214a in the region indicated by the slit width D. Therefore, when the scan pattern of the reset scan of the electronic front curtain is set to obtain an appropriate exposure value at the position of the lens 214a, overexposure occurs at the beginning of opening of the shutter when photographing is made at the position of the lens 214b.

FIG. 11 shows a state of the latter half of the photographing operation (near the end of photographing). A slit width C' indicates the width of a region formed by a line where a light beam coming from the lens 214a with zero shift mount is shielded by the mechanical rear curtain 3, and the reset line 4. A slit width D' indicates the width of a region formed by a line where a light beam coming from the lens 214b with the shift amount y is shielded by the mechanical rear curtain 3, and the reset line 4.

At the timing shown in FIG. 11, the slit width D' is larger than the slit width C' as in the state in which the shutter begins to open shown in FIG. 10. Hence, when the electronic front curtain and the mechanical rear curtain are to be driven under the same condition, the exposure amount obtained at the position of the lens 214b becomes larger than that obtained at the position of the lens 214a in the region indicated by the slit width D'. Therefore, when the scan pattern of the reset scan of the electronic front curtain is set to obtain an appropriate exposure value at the position of the lens 214a, overexposure occurs at the beginning of opening of the shutter when photographing is made at the position of the lens 214b. Also, since an overexposure amount is not constant but it changes from the beginning to the end of opening of the shutter, exposure nonuniformity (i.e., that in the vertical direction) consequently occurs in the upper and lower portions of an image.

Figure 12A:
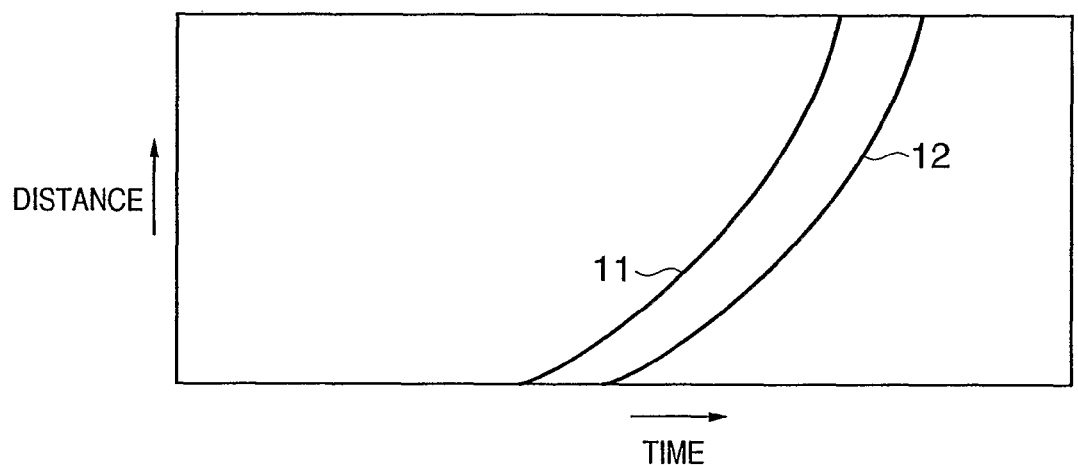
FIGS. 12A and 12B are graphs showing the relationship between the scan curves of the electronic front curtain and those of the mechanical rear curtain at different lens shift amounts.
Figure 12B:
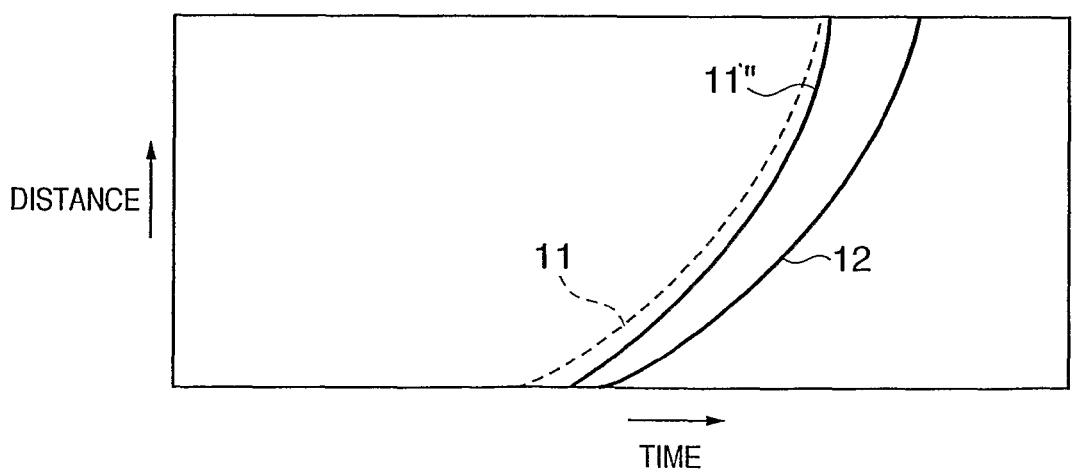

FIGS. 12A and 12B show the relationship between the scan pattern of the reset scan of the electronic front curtain and the traveling pattern of the mechanical rear curtain under the shutter control. In FIGS. 12A and 12B, the abscissa plots time, and the ordinate plots the distance from the top to the bottom on the image sensing element. Note that FIG. 12A is the same graph as FIG. 5A.

As described above, in case of the lens located at the position shifted by the shift amount y in the same direction as the traveling direction of the mechanical shutter, overexposure occurs. More specifically, with the shutter control shown in FIG. 12A, overexposure especially occurs on the lower portion of the image sensing plane (=the upper portion of an image), and overexposure of a small amount also occurs on the upper portion of the image sensing plane (=the lower portion of an image). For this reason, the scan curve of the electronic front curtain is adjusted to shorten the exposure time period on the lower portion of the image sensing plane by a relatively larger value, and to shorten the exposure time period on the upper portion of the image sensing plane by a relatively smaller value. That is, the scan curve 11 must be corrected to a scan curve 11", as shown in FIG. 12B.

Contrary to the above-mentioned case, in case of a lens whose optical axis is located at a position shifted in a direction opposite to the traveling direction of the mechanical shutter, if the scan pattern of the reset scan of the electronic front curtain for zero shift amount is set, underexposure occurs. Therefore, the scan curve of the electronic front curtain is adjusted to prolong the exposure time period on the lower portion of the image sensing plane by a relatively smaller value, and to prolong the exposure time period on the upper portion of the image sensing plane by a relatively larger value.

The aforementioned correction processing will be described below with reference to the flowchart of FIG. 13 while following the operations of the camera. Note that the processing shown in FIG. 13 is mainly executed by the camera CPU 113.

Figure 13:
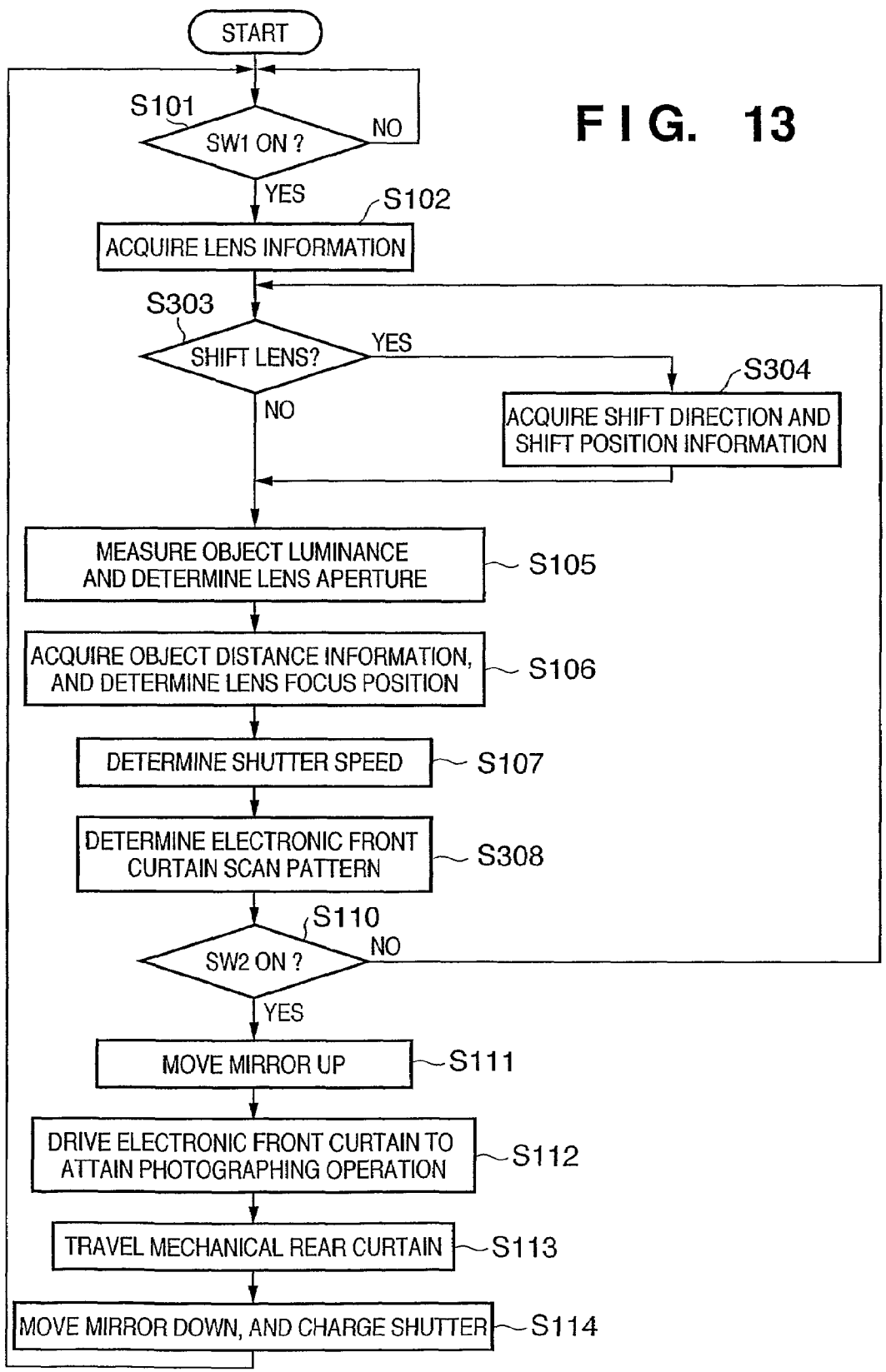
FIG. 13 is a flowchart showing the photographing operation of the image sensing apparatus according to the second embodiment of the present invention.

In the flowchart of FIG. 13, steps S103, S104, and S108 in the flowchart of FIG. 6 are replaced by steps S303, S304, and S308. In this embodiment, a description of only these steps S303, S304, and S308 will be given.

When the flow advances from step S102 to step S303, it is checked if the mounted exchangeable lens 201 is a shift lens. If the exchangeable lens 201 is a shift lens, the flow advances from step S303 to step S304 to acquire shift position information from the lens CPU 115. Note that the lens CPU 115 of the exchangeable lens 201 sends the lens information (the focal length and the like) of the lens, and information generated based on the shift position of the lens detected by the shift position direction/detection circuit 219 in response to requests from the camera CPU 113. The flow then advances to step S105.

When the flow advances from step S107 to step S308, the scan curve pattern of the electronic front curtain is determined based on the type, focal length, shift position, and the like of the exchangeable lens 201. In this case, the camera CPU 113 changes the setting of the vertical drive modulation circuit 108 to, e.g., that of the scan curve 11" shown in FIG. 12B. This scan curve 11" is appropriate to a lens whose optical axis is shifted in the same direction as the traveling direction of the mechanical shutter. The scan curve 11" is obtained by delaying the start timing of the reset scan of the electronic front curtain and also delaying the scan end timing by a smaller amount than the delay time of the start timing with respect to the scan curve 11 indicating nearly an equal operation to that of the traveling curve 12 of the mechanical rear curtain.

The second embodiment has explained the case of the lens which allows tilt/shift photographing, and in particular, the photographing lens having the shift optical system which can translate the optical axis parallel to the image sensing plane. However, the present invention is not limited to such specific lens, but the same processing as in the above processing can be applied to an anti-vibration lens which shifts at least some of lens groups to prevent a blurred image from being taken due to camera shake upon photographing. Even in a photographing lens which is a lens which allows tilt/shift photographing and has a tilt mechanism which can tilt the optical axis with respect to the image sensing plane, the same arrangement can be explained by replacing "shift" by "tilt".

Figure 14:
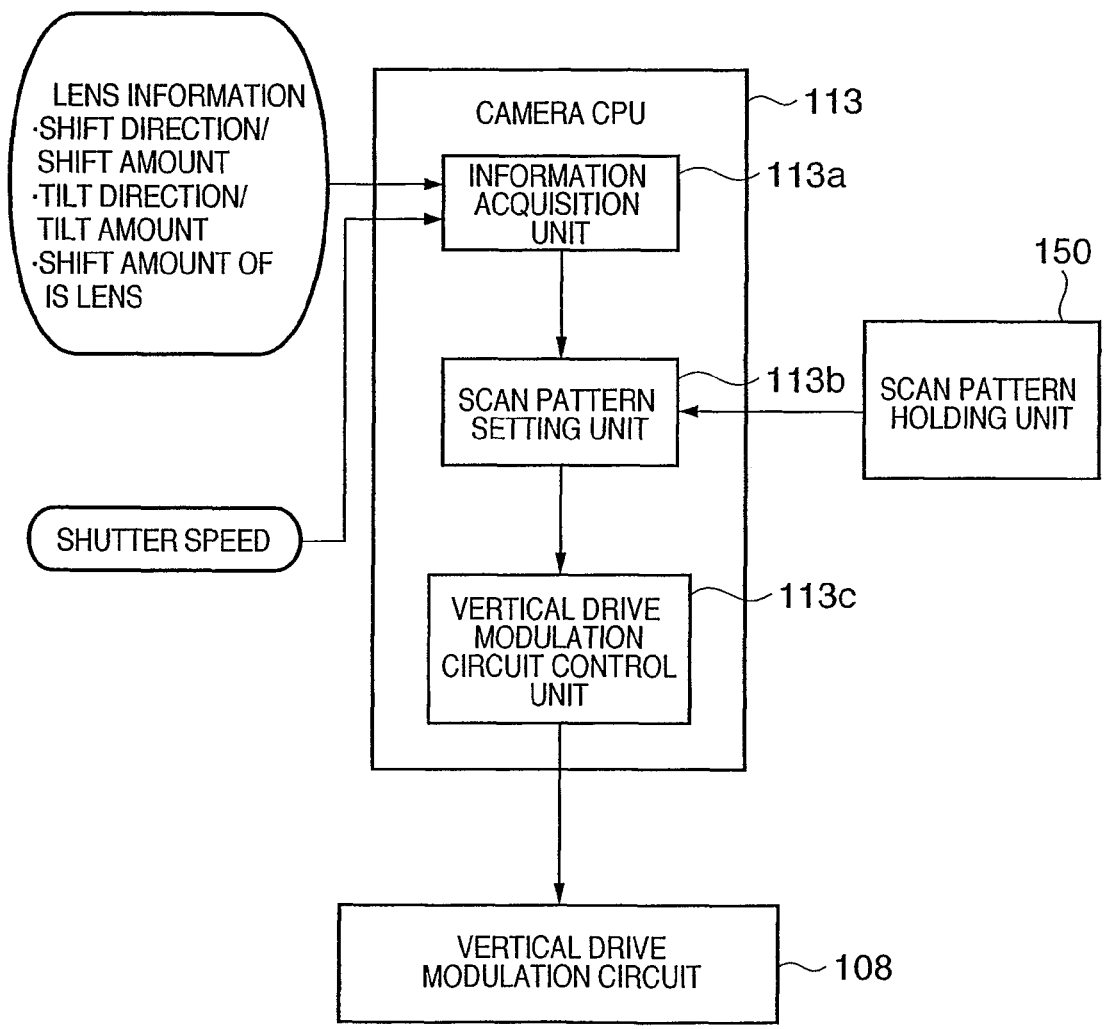
FIG. 14 is a block diagram for explaining the functional arrangement for scan pattern control by a camera CPU of the image sensing apparatus according to the second embodiment of the present invention.
Figure 15:
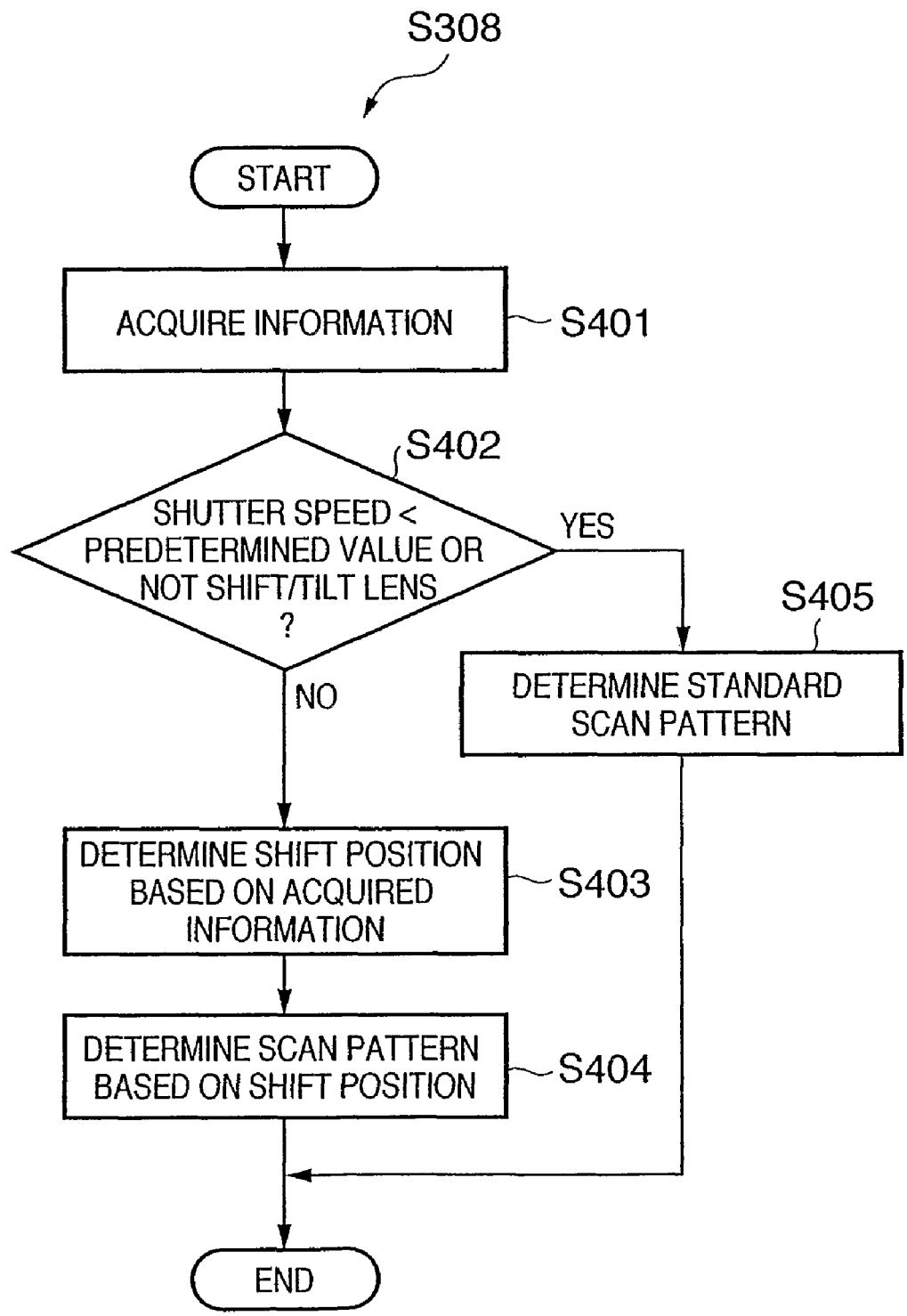
FIG. 15 is a flowchart for explaining the determination processing of a scan pattern of the image sensing apparatus according to the second embodiment of the present invention.

The processing in step S308 will be described in more detail below with reference to FIGS. 14 and 15. FIG. 14 is a block diagram showing the arrangement associated with the scan pattern control of the electronic front curtain (reset scan) according to this embodiment. FIG. 15 is a flowchart showing the setting processing (step S308) of the scan pattern.

An information acquisition unit 113a of the camera CPU 113 acquires information associated with a shift position or tilt angle of a lens which allows tilt/shift photographing or information associated with a shift position of a shift optical system as some of lens groups in a lens that exhibits an anti-vibration effect. The information acquisition unit 113a passes the acquired information to a scan pattern setting unit 113b (step S401). The scan pattern setting unit 113b determines the scan pattern of the electronic front curtain based on the information acquired by the information acquisition unit 113a (steps S402 to S405).

It is checked in step S402 if a condition that the shutter speed is lower than a predetermined value (the shutter time is longer than a predetermined value), or the exchangeable lens is not a shift/tilt lens is satisfied. If this condition is satisfied, the flow advances to step S405 to determine a standard scan pattern as that to be adopted. In this embodiment, as the standard scan pattern, a scan curve having substantially the same curve shape of that of the mechanical rear curtain like the scan curve 11 shown in FIG. 12A (the exposure time periods of respective lines of the image sensing element from the beginning to the end of photographing are nearly the same) is adopted.

Exposure nonuniformity caused depending on the lens shift position or the tilt direction and tilt amount of the photographing lens is especially considerably produced when the slit width of the shutter is narrow at a high shutter speed, as described above. Hence, in this embodiment, as in the first embodiment, in the shutter time range in which the shutter time is long (e.g., ⅛ sec or less), and exposure nonuniformity can be sufficiently ignored even if it occurs, the scan pattern of the reset scan of the electronic front curtain is not corrected. Of course, this arrangement is an option, and steps S402 and S405 may be omitted.

On the other hand, if the exchangeable lens 201 is a shift/tilt lens and the shutter speed is equal to or higher than the predetermined value (the shutter time is equal to or smaller than the predetermined value), the flow advances from step S402 to step S403. The scan pattern setting unit 113b determines the shift position (or tilt angle) based on the information acquired in step S401. In step S404, the scan pattern setting unit 113b determines a scan pattern to be adopted based on the determined shift position (or tilt angle).

As described above, according to this embodiment, since the scan pattern of the electronic front curtain is switched based on the information of the photographing lens, an appropriate image from which exposure nonuniformity is eliminated can be taken.

Note that the shift position (or tilt angle) can be determined in step S403 based on, e.g., the shift position information acquired from the lens CPU 115 of the mounted exchangeable lens 201.

As an example of information that can be used to switch the scan pattern, this embodiment has explained the case of the photographing lens which is mainly a lens that allows tilt/shift photographing, and in particular, a photographing lens having a shift optical system which can translate the optical axis. The same applies to a photographing lens which is a lens that allows tilt/shift photographing, and a photographing lens having a tilt mechanism that can tilt the optical axis, as described above.

In addition, the present invention can also be applied to an anti-vibration lens which shifts at least some of lens groups to prevent a blurred image from being taken due to camera shake upon photographing.

Third Embodiment

The arrangement of an image sensing apparatus according to the third embodiment of the present invention will be described below using FIG. 16. The image sensing apparatus according to the third embodiment is substantially the same as that shown in the second embodiment (FIG. 9), except that it comprises a mechanical shutter 305 having a mechanical front curtain and a mechanical rear curtain which are made up of a plurality of light-shielding blades and move independently. Note that such mechanical shutter 305 is known to those who are skilled in the art, and a detailed description of its structure will be omitted.

Figure 17:
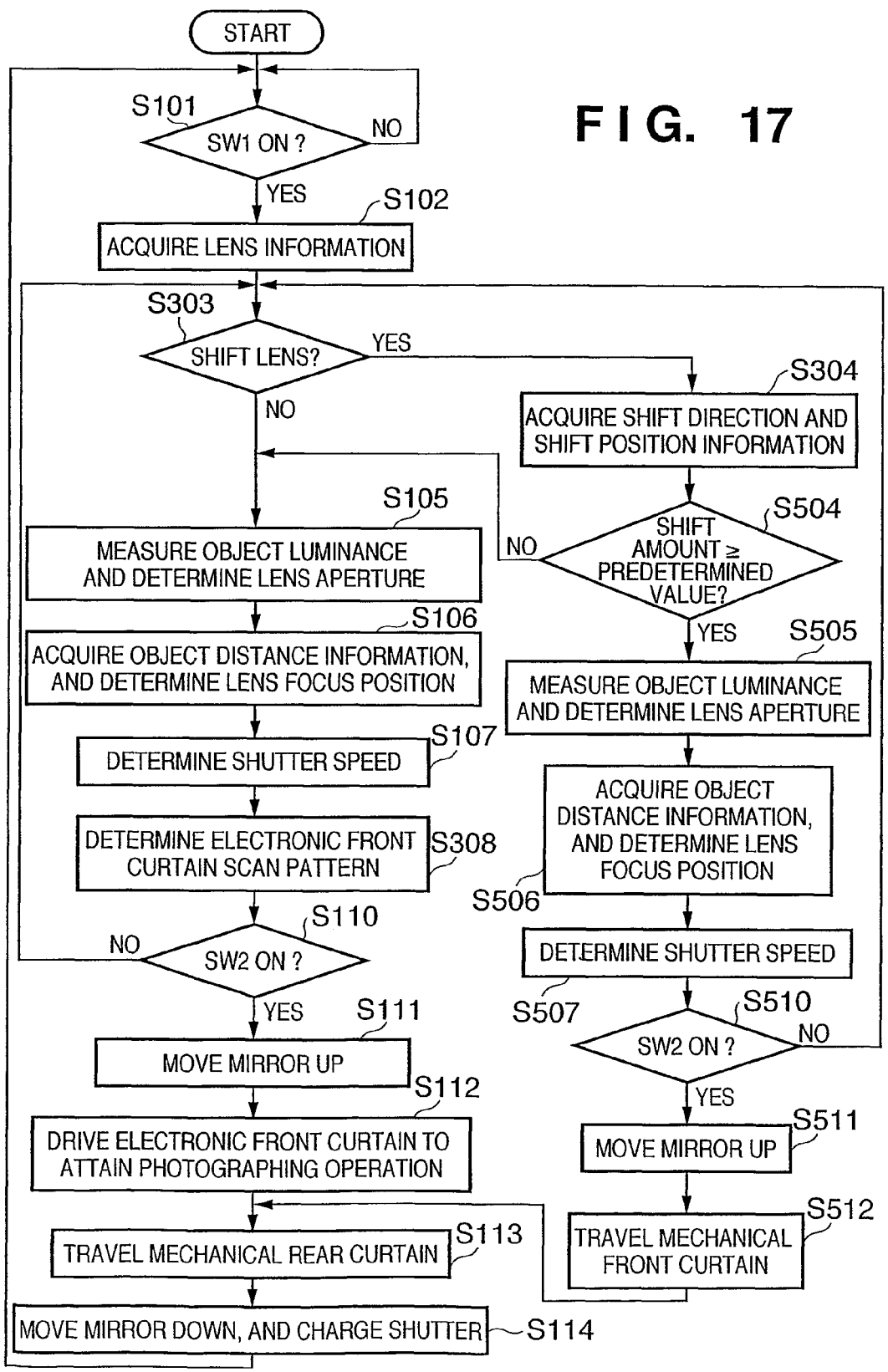
FIG. 17 is a flowchart showing the photographing operation of the image sensing apparatus according to the third embodiment of the present invention.

The correction processing of the third embodiment will be described below with reference to the flowchart of FIG. 17 while following the operations of the camera. Note that since the processing shown in FIG. 13 is partially modified in the flow of FIG. 17, steps S504 to S507 and S510 to S512 as the changed part will be described below.

When the shift position information is acquired from the lens CPU 115 in step S304, it is checked in step S504 if the shift amount is equal to or larger than a predetermined value. If the shift amount is less than the predetermined value, the flow advances to step S105 to operate the electronic shutter as a front curtain and the mechanical shutter as a rear curtain. On the contrary, if the shift amount is equal to or larger than the predetermined value, the flow advances to step S505 to operate the mechanical shutters as the front and rear curtains.

If the lens shift amount is large, exposure nonuniformity which may be produced also becomes large. Therefore, the front curtain traveling timing by the electronic shutter must be largely corrected. However, when the correctable range is exceeded, the mechanical shutter is also used as the front curtain.

Since the reset scan of the electronic shutter allows exposure start at an earlier timing than a case wherein the mechanical shutter travels as the front curtain, it has an advantage of a short release time lag. However, as described above, when the shift amount is large, and there is concern of large exposure nonuniformity, the control is switched to that to drive the mechanical shutter as a front curtain.

The subsequent steps S505, S506, S507, S510, and S511 are the same as steps S105, S106, S107, S110, and S111 in FIG. 6. In steps S512 and S113, the mechanical front and rear curtains travel at timings according to the shutter speed determined in step S507.

Note that whether the electronic shutter or the mechanical shutter is used as the front curtain is determined according to the shift amount of the shift lens. However, the present invention is not limited to this. For example, if the exit pupil distance is less than a predetermined value, the mechanical shutter can be operated as the front curtain; otherwise, the electronic shutter can be operated as the front curtain. In addition, the image sensing operation may be controlled such that the mechanical shutter is operated as the front curtain when the aperture diameter is larger than a predetermined value or a focal length of a zoom lens is less than a predetermined value, and the electronic shutter is operated as the front curtain in other cases.

Fourth Embodiment

Figure 18:
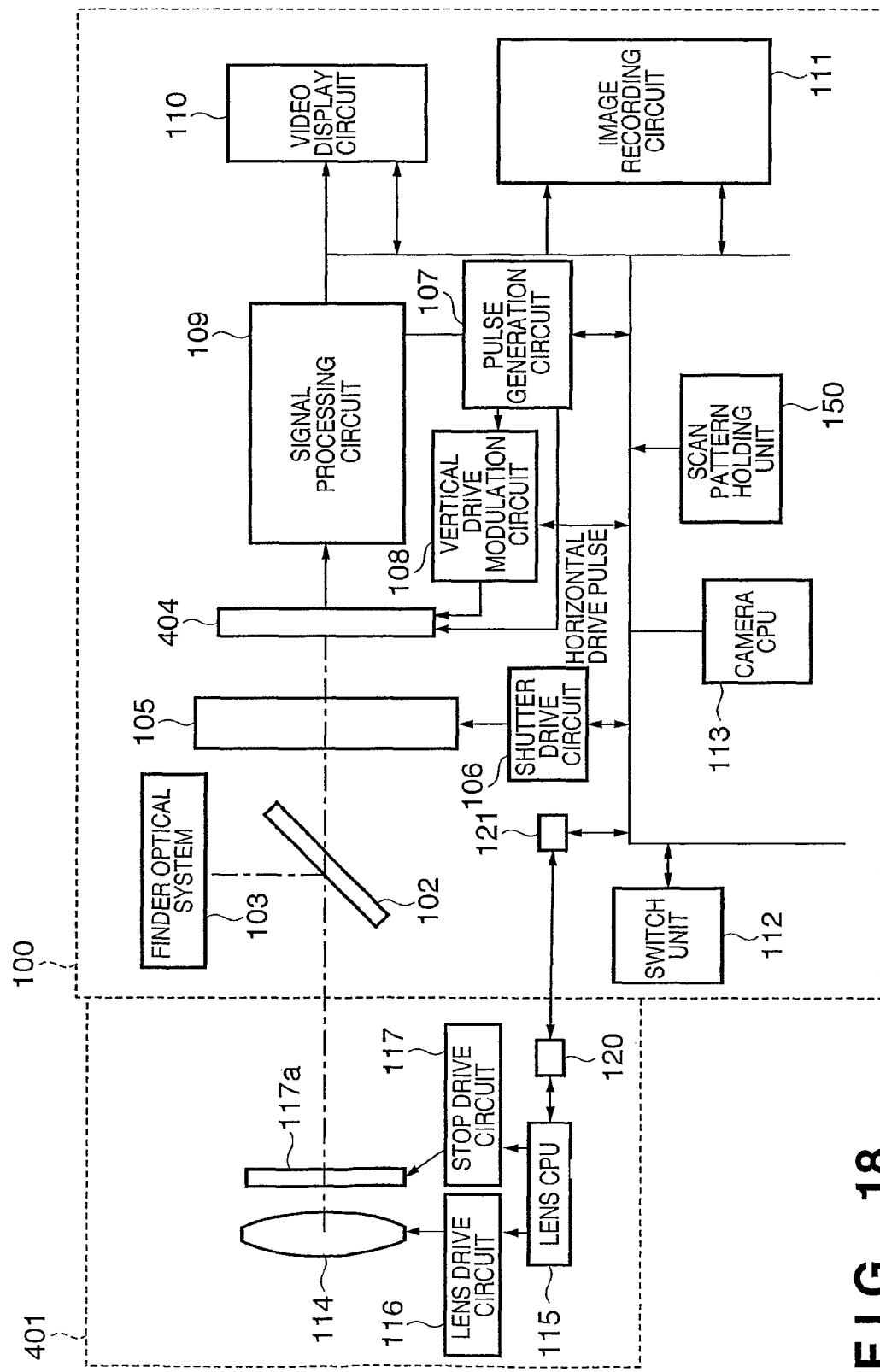
FIG. 18 is a block diagram showing the arrangement of an image sensing apparatus according to the fourth embodiment of the present invention.

The arrangement of an image sensing apparatus according to the fourth embodiment of the present invention will be described below using FIG. 18. The image sensing apparatus according to the fourth embodiment is substantially the same as that shown in the first embodiment (FIG. 1), except that it comprises an image sensing element 404 which can be shifted to attain an anti-vibration function. This image sensing element 404 provides an anti-vibration function by shifting its center from the optical axis position in place of the photographing lens. When the image sensing element 404 is shifted, the relationship between the shutter position and exposure amount can be considered in the same manner as the shift position and shift direction of the lens in the second embodiment.

Figure 19:
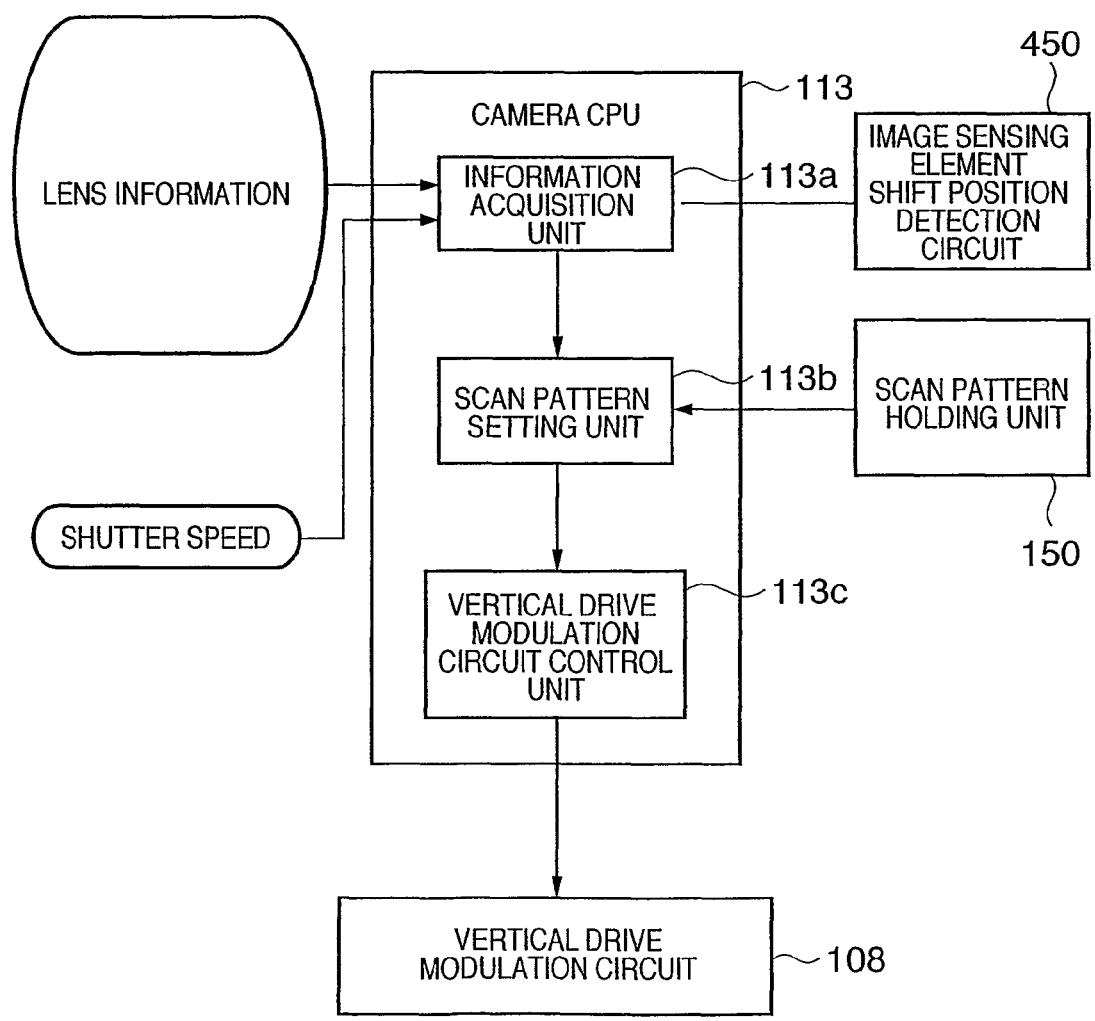
FIG. 19 is a block diagram for explaining the functional arrangement for scan pattern control by a camera CPU of the image sensing apparatus according to the fourth embodiment of the present invention.

FIG. 19 is a block diagram showing the arrangement associated with the scan pattern control of the electronic front curtain (reset scan) according to this embodiment. FIG. 19 is substantially the same as FIG. 7, except that this arrangement comprises a shift position detection circuit 450 for detecting the shift position information of the image sensing element.

As has also been described using FIG. 7, the camera CPU 113 serves as an information acquisition unit 113a, a scan pattern setting unit 113b, and a vertical drive modulation circuit control unit 113c. The information acquisition unit 113a acquires information of the shift position detection circuit 450 for detecting the shift position information of the image sensing element upon enabling the anti-vibration function in addition to the lens information of an exchangeable lens 401 and shutter speed information required to obtain an appropriate exposure value, and passes them to the scan pattern setting unit 113b. The scan pattern setting unit 113b determines the scan pattern of the electronic front curtain based on the information acquired by the information acquisition unit 113*a*.

Therefore, since the scan pattern is switched by providing setting means for setting the scan pattern of the charge accumulation start scan by shutter control means in accordance with the shift amount of the image sensing element, an appropriate image from which exposure nonuniformity is eliminated can be taken.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-213374, filed Jul. 22, 2005, No. 2006-193236, filed Jul. 13, 2006 which are hereby incorporated by reference herein in their entirety.

The invention claimed is:

1. An image sensing apparatus having an image sensing element which receives light that has passed through an optical unit and accumulates the light as a charge, a mechanical shutter which travels to shield said image sensing element, a scan unit which makes a scan for starting charge accumulation for each region of said image sensing element, and a control unit which executes the scan for starting charge accumulation prior to traveling of said mechanical shutter and controls the scan for starting charge accumulation and traveling of said mechanical shutter so it serves as a front curtain and a rear curtain of a shutter,
   wherein said control unit sets a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element, and
   wherein said control unit delays a timing of starting the scan for starting charge accumulation behind a timing of a first scan pattern which matches a traveling pattern of said mechanical shutter, and advances a timing of ending the scan for starting charge accumulation ahead of a timing of the first scan pattern, with decreasing exit pupil distance of the optical unit.

2. An image sensing apparatus having an image sensing element which receives light that has passed through an optical unit and accumulates the light as a charge, a mechanical shutter which travels to shield said image sensing element, a scan unit which makes a scan for starting charge accumulation for each region of said image sensing element, and a control unit which executes the scan for starting charge accumulation prior to traveling of said mechanical shutter and controls the scan for starting charge accumulation and traveling of said mechanical shutter so it serves as a front curtain and a rear curtain of a shutter,
   wherein said apparatus further comprises a registration unit which registers timings of starting the scan for respective groups divided depending on exit pupil distances of the optical unit,
   wherein said control unit sets a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element, and
   wherein said control unit sets the timing of making the scan for starting charge by obtaining a timing from the registration unit, which corresponds to a group to which an exit pupil distance of the optical unit belongs.

3. An image sensing apparatus having an image sensing element which receives light that has passed through an optical unit and accumulates the light as a charge, a mechanical shutter which travels to shield said image sensing element, a scan unit which makes a scan for starting charge accumulation for each region of said image sensing element, and a control unit which executes the scan for starting charge accumulation prior to traveling of said mechanical shutter and controls the scan for starting charge accumulation and traveling of said mechanical shutter so it serves as a front curtain and a rear curtain of a shutter,
   wherein the optical unit has a shift lens which is movable in a direction intersecting an optical axis,
   wherein said control unit sets a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element, and
   wherein when a shift direction of the shift lens agrees with a traveling direction of said mechanical shutter, said control unit delays a timing of starting the scan for starting charge accumulation behind a timing of a first scan pattern which matches a traveling pattern of said mechanical shutter, and delays a timing of ending the scan for starting charge accumulation behind a timing of the first scan pattern, with increasing shift amount of the shift lens.

4. An image sensing apparatus having an image sensing element which receives light that has passed through an optical unit and accumulates the light as a charge, a mechanical shutter which travels to shield said image sensing element, a scan unit which makes a scan for starting charge accumulation for each region of said image sensing element, and a control unit which executes the scan for starting charge accumulation prior to traveling of said mechanical shutter and controls the scan for starting charge accumulation and traveling of said mechanical shutter so it serves as a front curtain and a rear curtain of a shutter,
   wherein the optical unit has a shift lens which is movable in a direction intersecting an optical axis,
   wherein said control unit sets a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element, and
   wherein when a shift direction of the shift lens is opposite to a traveling direction of said mechanical shutter, said control unit advances a timing of starting the scan for starting charge accumulation ahead of a timing of a first scan pattern which matches a traveling pattern of said mechanical shutter, and advances a timing of ending the scan for starting charge accumulation ahead of a timing of the first scan pattern, with increasing shift amount of the shift lens.

5. A control method of an image sensing apparatus having an image sensing element which receives light that has passed through an optical unit and accumulates the light as a charge, a mechanical shutter which travels to shield said image sensing element, and a scan unit which makes a scan for starting charge accumulation for each region of said image sensing element, said method comprising:

a setting step of setting a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element; and a control step of executing, in accordance with the timing set in said setting step, the scan for starting charge accumulation prior to traveling of said mechanical shutter and controlling the scan for starting charge accumulation and traveling of said mechanical shutter so it serves as a front curtain and a rear curtain of a shutter, wherein said setting step delays a timing of starting the scan for starting charge accumulation behind a timing of a first scan pattern which matches a traveling pattern of said mechanical shutter, and advances a timing of ending the scan for starting charge accumulation ahead of a timing of the first scan pattern, with decreasing exit pupil distance of the optical unit.

6. A control method of an image sensing apparatus having an image sensing element which receives light that has passed through an optical unit and accumulates the light as a charge, a mechanical shutter which travels to shield said image sensing element, a scan unit which makes a scan for starting charge accumulation for each region of said image sensing element, and a registration unit which registers timings of starting the scan for respective groups divided depending on exit pupil distances of the optical unit, the method comprising:

a setting step of setting a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element; and a control step of executing, in accordance with the timing set in said setting step, the scan for starting charge accumulation prior to traveling of said mechanical shutter and controlling the scan for starting charge accumulation and traveling of said mechanical shutter so it serves as a front curtain and a rear curtain of a shutter, wherein said setting step sets the timing of making the scan for starting charge by obtaining a timing from the registration unit, which corresponds to a group to which an exit pupil distance of the optical unit belongs.

7. A control method of an image sensing apparatus having an optical unit that has a shift lens movable in a direction intersecting an optical axis, an image sensing element which receives light that has passed through the optical unit and accumulates the light as a charge, a mechanical shutter which travels to shield said image sensing element, and a scan unit which makes a scan for starting charge accumulation for each region of said image sensing element, said method comprising:

a setting step of setting a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element; and a control step of executing, in accordance with the timing set in said setting step, the scan for starting charge accumulation prior to traveling of said mechanical shutter and controlling the scan for starting charge accumulation and traveling of said mechanical shutter so it serves as a front curtain and a rear curtain of a shutter, wherein when a shift direction of the shift lens agrees with a traveling direction of said mechanical shutter, said setting step delays a timing of starting the scan for starting charge accumulation behind a timing of a first scan pattern which matches a traveling pattern of said mechanical shutter, and delays a timing of ending the scan for starting charge accumulation behind a timing of the first scan pattern, with increasing shift amount of the shift lens.

8. A control method of an image sensing apparatus having an optical unit that has a shift lens movable in a direction intersecting an optical axis, an image sensing element which receives light that has passed through the optical unit and accumulates the light as a charge, a mechanical shutter which travels to shield said image sensing element, a scan unit which makes a scan for starting charge accumulation for each region of said image sensing element, said method comprising:

a setting step of setting a timing for performing the scan for starting charge accumulation for each region of said image sensing element so that there exist regions of said image sensing element, in which a time period from the beginning of charge accumulation by said scan unit until said mechanical shutter travels on that region is different from each other, so as to eliminate nonuniformity of an exposure amount produced for each region of said image sensing element; and a control step of executing, in accordance with the timing set in said setting step, the scan for starting charge accumulation prior to traveling of said mechanical shutter and controls the scan for starting charge accumulation and traveling of said mechanical shutter so it serves as a front curtain and a rear curtain of a shutter, wherein when a shift direction of the shift lens is opposite to a traveling direction of said mechanical shutter, said setting step advances a timing of starting the scan for starting charge accumulation ahead of a timing of a first scan pattern which matches a traveling pattern of said mechanical shutter, and advances a timing of ending the scan for starting charge accumulation ahead of a timing of the first scan pattern, with increasing shift amount of the shift lens.

* * * * *